(12) United States Patent
Hiroi et al.

(10) Patent No.: US 12,509,608 B2
(45) Date of Patent: Dec. 30, 2025

(54) BIOLOGICAL MATERIAL ADHESION INHIBITOR

(71) Applicant: NISSAN CHEMICAL CORPORATION, Tokyo (JP)

(72) Inventors: Miya Hiroi, Funabashi (JP); Takeaki Shoji, Funabashi (JP); Yoshiomi Hiroi, Funabashi (JP); Natsuki Abe, Shiraoka (JP); Yuki Ueda, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 646 days.

(21) Appl. No.: 17/904,470

(22) PCT Filed: Feb. 18, 2021

(86) PCT No.: PCT/JP2021/006234
§ 371 (c)(1),
(2) Date: Aug. 17, 2022

(87) PCT Pub. No.: WO2021/167037
PCT Pub. Date: Aug. 26, 2021

(65) Prior Publication Data
US 2023/0106591 A1    Apr. 6, 2023

(30) Foreign Application Priority Data
Feb. 19, 2020   (JP) .................. 2020-025868

(51) Int. Cl.
| | |
|---|---|
| *C09D 143/02* | (2006.01) |
| *C08F 230/02* | (2006.01) |
| *C09D 5/16* | (2006.01) |
| *C09D 133/04* | (2006.01) |
| *C12M 1/00* | (2006.01) |

(52) U.S. Cl.
CPC .......... *C09D 143/02* (2013.01); *C08F 230/02* (2013.01); *C09D 5/16* (2013.01); *C09D 5/1668* (2013.01); *C09D 133/04* (2013.01); *C12M 23/20* (2013.01)

(58) Field of Classification Search
None
See application file for complete search history.

(56) References Cited

U.S. PATENT DOCUMENTS

| | | | |
|---|---|---|---|
| 2016/0122576 A1 | 5/2016 | Hiroi et al. | |
| 2017/0349777 A1 | 12/2017 | Hiroi et al. | |
| 2025/0011602 A1* | 1/2025 | Ueda | ................... C09D 5/1668 |

FOREIGN PATENT DOCUMENTS

| | | | |
|---|---|---|---|
| JP | S59-084964 A | 5/1984 | |
| JP | H03-275705 A | 12/1991 | |
| JP | H10-197831 A | 7/1998 | |
| JP | 2007-231174 A | 9/2007 | |
| JP | 2014114245 | * 6/2014 | |
| WO | WO 2014/196650 A1 | 12/2014 | |
| WO | WO 2016/093293 A1 | 6/2016 | |
| WO | WO 2019/107503 A1 | 6/2019 | |

OTHER PUBLICATIONS

Japan Patent Office, Office Action in Japanese Patent Application No. 2022-501996 (Sep. 24, 2024).
Japan Patent Office, International Search Report in International Patent Application No. PCT/JP2021/006234 (May 11, 2021).

* cited by examiner

*Primary Examiner* — David J Buttner
(74) *Attorney, Agent, or Firm* — Leydig, Voit & Mayer, Ltd.

(57) ABSTRACT

Provided are a composition for forming a coating film, a coating film and a substrate having the coating film, which have excellent compatibility with biological substances, as well as a method for producing the same. A composition for forming a coating film having the ability to inhibit adhesion of biological substances, the composition comprising a copolymer and a solvent, wherein the copolymer is obtained by subjecting a monomer mixture to polymerization, wherein the monomer mixture comprises compounds represented by the following formulae (1), (2), and (3):

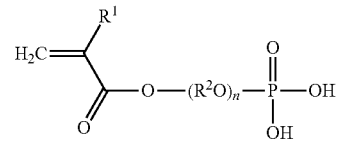

(1)

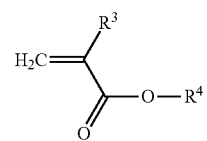

(2)

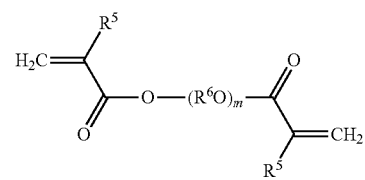

(3)

wherein $R^1$ to $R^6$, n, and m are as defined in the Description and Claims,
wherein the compound represented by the formula (3) above is contained in a predetermined amount in the monomer mixture, a coating film obtained from the composition, and a substrate having the coating film as well as a method for producing the same.

6 Claims, 2 Drawing Sheets

BIOLOGICAL MATERIAL ADHESION INHIBITOR

FIELD OF THE INVENTION

The present invention relates to a composition for forming a coating film having the ability to inhibit adhesion of biological substances, a coating film obtained from the composition, a substrate having the coating film and a method for producing the same.

BACKGROUND ART

For inhibiting adhesion of biological substances to instruments and devices for medical use, such as an artificial dialysis apparatus, an artificial organ, and a medical instrument, various types of coating materials having the ability to inhibit adhesion of biological substances, and coating materials for promoting cell culture have been proposed.

The present inventors have reported that a coating agent containing the copolymer having a specific anionic group and cationic group can be firmly fixed to a substrate, irrespective of the type of the substrate, and that, after being fixed, the coating film has excellent resistance to an aqueous solvent and exhibits excellent ability to inhibit adhesion of biological substances (for example, platelets and fibrinogen) (see, for example, patent documents 1 and 2).

PRIOR ART REFERENCES

Patent Documents

Patent document 1: International Patent Application Publication No. 2014/196650

Patent document 2: International Patent Application Publication No. 2016/093293

SUMMARY OF THE INVENTION

Problems to be Solved by the Invention

In the present invention, there are provided a composition for forming a coating film having the ability to inhibit adhesion of biological substances, a coating film obtained from the composition, a substrate having the coating film and a method for producing the same.

Means for Solving the Problems

The present inventors have found that when a copolymer having a specific anionic group and cationic group contains a crosslinked structure in a predetermined amount, the copolymer exhibits excellent ability to inhibit adhesion of biological substances, and the present invention has been completed.

Specifically, the present invention is as follows.

[1] A composition for forming a coating film having the ability to inhibit adhesion of biological substances, the composition comprising a copolymer and a solvent, wherein the copolymer is obtained by subjecting a monomer mixture to polymerization, the monomer mixture comprising a compound represented by the following formula (1):

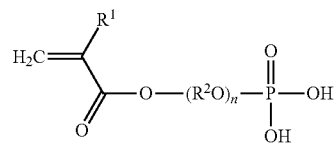

wherein $R^1$ represents a hydrogen atom or a linear or branched alkyl group having 1 to 6 carbon atoms, $R^2$ represents a linear or branched alkylene group having 1 to 6 carbon atoms, and n represents an integer of 1 to 30, a compound represented by the following formula (2):

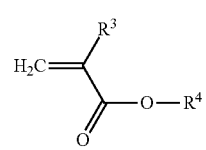

wherein $R^3$ represents a hydrogen atom or a linear or branched alkyl group having 1 to 5 carbon atoms, and $R^4$ represents a cationic monovalent organic group, and a compound represented by the following formula (3):

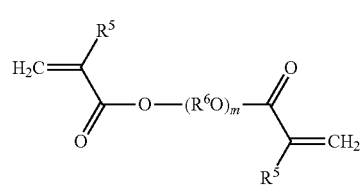

wherein each $R^5$ independently represents a hydrogen atom or a linear or branched alkyl group having 1 to 6 carbon atoms, $R^6$ represents a linear or branched alkylene group having 1 to 10 carbon atoms which may be substituted with a halogen atom, and m represents an integer of 1 to 30, wherein the amount of the compound represented by the formula (3) above is 2 to 40% by mass, based on the mass of the monomer mixture.

[2] A coating film having the ability to inhibit adhesion of biological substances, which is a coating film comprising the composition for forming the coating film according to item [1] above.

[3] A substrate having the ability to inhibit adhesion of biological substances, which has the coating film according to item [2] above on the surface thereof.

[4] The substrate having the ability to inhibit adhesion of biological substances according to item [3] above, which is for use in cell culture.

[5] A method for producing a substrate having the ability to inhibit adhesion of biological substances, comprising the steps of: applying the composition for forming the coating film according to item [1] above to a substrate; and then drying the applied composition.

[6] A cell culture container having the surface coated with a copolymer, wherein the copolymer is obtained by subjecting a monomer mixture to polymerization, the monomer mixture comprising a compound represented by the following formula (1):

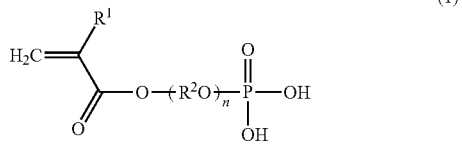

wherein $R^1$ represents a hydrogen atom or a linear or branched alkyl group having 1 to 6 carbon atoms, $R^2$ represents a linear or branched alkylene group having 1 to 6 carbon atoms, and n represents an integer of 1 to 30, a compound represented by the following formula (2):

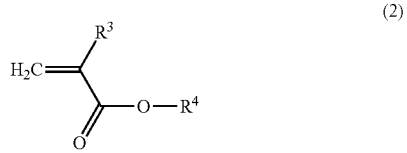

wherein $R^3$ represents a hydrogen atom or a linear or branched alkyl group having 1 to 6 carbon atoms, and $R^4$ represents a cationic monovalent organic group, and a compound represented by the following formula (3):

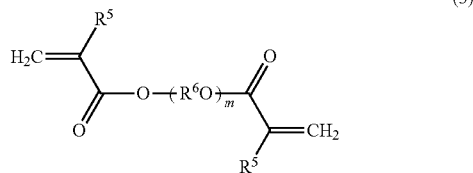

wherein each $R^5$ independently represents a hydrogen atom or a linear or branched alkyl group having 1 to 6 carbon atoms, $R^6$ represents a linear or branched alkylene group having 1 to 10 carbon atoms which may be substituted with a halogen atom, and m represents an integer of 1 to 30, wherein the amount of the compound represented by the formula (3) above is 2 to 40% by mass, based on the mass of the monomer mixture.

Effects of the Invention

The composition for forming the coating film of the present invention has excellent ability to inhibit adhesion of biological substances by virtue of containing a copolymer which is obtained by subjecting to polymerization a monomer mixture comprising the compounds represented by the formulae (1) and (2) and the compound represented by the formula (3) in a predetermined amount. Particularly, the composition of the present invention contains a copolymer having a specific anionic group and cationic group and containing a crosslinked structure in a predetermined amount, and therefore has the improved ability to inhibit adhesion of biological substances, as compared to a composition containing a conventional copolymer having a specific anionic group and cationic group. Specifically, a substrate having a coating film formed from the composition for forming the coating film of the present invention has excellent ability to inhibit adhesion of biological substances, such as a protein, and to promote cell culture.

MODE FOR CARRYING OUT THE INVENTION

Description of Terms

Figure 1:
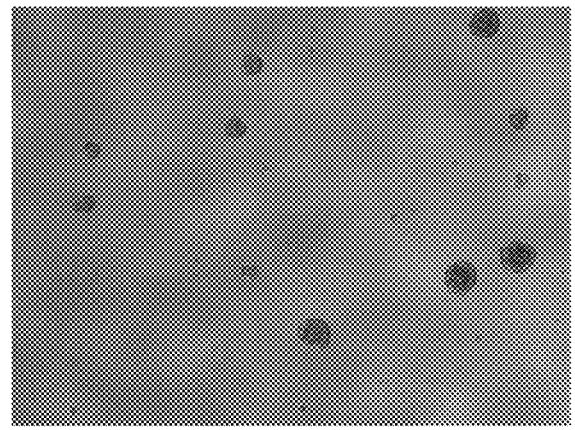
FIG. 1 A photomicrograph of the well coated with the composition for forming the coating film prepared in Preparation Example 3, which has been subjected to Test Example 1.

The terms used in the present invention have the definition described below unless otherwise specified.

In the present invention, the term "halogen atom" means a fluorine atom, a chlorine atom, a bromine atom, or an iodine atom.

In the present invention, the term "ester linkage" means —C(=O)—O— or O—C(=O)—, the term "amide linkage" means —NHC(=O)— or C(=O)NH—, the term "ether linkage" means —O—, and the term "phosphodiester linkage" means —O—P(=O)(OH)—O—.

In the present invention, the term "alkylene group" means a divalent saturated aliphatic hydrocarbon group.

The term "alkylene group having 1 to 6 carbon atoms" means a linear, branched, or cyclic alkylene group having 1 to 6 carbon atoms, and examples include linear alkylene groups, such as a methylene group, an ethylene group, a trimethylene group, a tetramethylene group, a pentamethylene group, and a hexamethylene group; branched alkylene groups, such as a propylene group, a 1-methyltrimethylene group, a 2-methyltrimethylene group, a 1,1-dimethylethylene group, a 1,2-dimethylethylene group, an ethylethylene group, a 1-methyltetramethylene group, a 2-methyltetramethylene group, a 1,1-dimethyltrimethylene group, a 1,2-dimethyltrimethylene group, a 1,3-dimethyltrimethylene group, a 2,2-dimethyltrimethylene group, a 1-ethyltrimethylene group, a 2-ethyltrimethylene group, a propylethylene group, a (1-methylethyl)ethylene group, a 1-methylpentamethylene group, a 2-methylpentamethylene group, a 3-methylpentamethylene group, a 1,1-dimethyltetramethylene group, a 1,2-dimethyltetramethylene group, a 1,3-dimethyltetramethylene group, a 1,4-dimethyltetramethylene group, a 2,2-dimethyltetramethylene group, a 2,3-dimethyltetramethylene group, a 1-ethyltetramethylene group, a 2-ethyltetramethylene group, a 1,1,2-trimethyltrimethylene group, a 1,2,2-trimethyltrimethylene group, a 1-ethyl-1-methyltrimethylene group, and a 1-ethyl-2-methyltrimethylene group; and cyclic alkylene groups, such as a 1,2-cyclopropanediyl group, a 1,2-cyclobutanediyl group, a 1,3-cyclobutanediyl group, a 1-methyl-1,2-cyclopropanediyl group, a 3-methyl-1,2-cyclopropanediyl group, a 1,2-cyclopentanediyl group, a 1,3-cyclopentanediyl group, a 1-methyl-1,2-cyclobutanediyl group, a 3-methyl-1,2-cyclobutanediyl group, a 1-methyl-1,3-cyclobutanediyl group, a 2-methyl-1,3-cyclobutanediyl group, a 1,2-dimethyl-1,2-cyclopropanediyl group, a 1,3-dimethyl-1,2-cyclopropanediyl group, a 3,3-dimethyl-1,2-cyclopropanediyl group, a 1-ethyl-1,2-cyclopropanediyl group, a 1,2-cyclohexanediyl group, a 1,3-cyclohexanediyl group, a 1,4-cyclohexanediyl group, a 1-methyl-1,2-cyclopentanediyl group, a 1-methyl-1,3-cyclopentanediyl group, a 3-methyl-1,2-cyclopentanediyl group, a 4-methyl-1,2-cyclopentanediyl group, a 2-methyl-1,3-cyclopentanediyl group, a 1-ethyl-1,2-cyclobutanediyl group, a 1-ethyl-1,3-cyclobutanediyl group, a 2-ethyl-1,3-cyclobutanediyl group, and a 4-methyl-1,2-cyclopentanediyl group.

The "alkylene group having 1 to 6 carbon atoms" is preferably a linear or branched alkylene group having 1 to 6 carbon atoms, more preferably a linear or branched alkylene group having 2 to 5 carbon atoms, especially preferably an ethylene group or a propylene group.

In the present invention, the term "linear or branched alkylene group having 1 to 10 carbon atoms which may be substituted with a halogen atom" means a "linear or branched alkylene group having 1 to 10 carbon atoms" or "linear or branched alkylene group having 1 to 10 carbon atoms and being substituted with at least one halogen atom".

Examples of "linear or branched alkylene groups having 1 to 10 carbon atoms" include the above-mentioned examples of "linear or branched alkylene groups having 1 to 6 carbon atoms", a heptamethylene group, an octamethylene group, a nonamethylene group, a decamethylene group, and isomers thereof. The "linear or branched alkylene group having 1 to 10 carbon atoms" is preferably a linear or branched alkylene group having 1 to 6 carbon atoms, more preferably a linear or branched alkylene group having 2 to 5 carbon atoms, especially preferably an ethylene group or a propylene group.

The term "linear or branched alkylene group having 1 to 10 carbon atoms and being substituted with at least one halogen atom" means a group obtained by replacing at least one hydrogen atom of the above-mentioned "linear or branched alkylene group having 1 to 10 carbon atoms" by a halogen atom, preferably a group obtained by replacing part of or all of hydrogen atoms of a linear or branched alkylene group having 1 to 6 carbon atoms by a halogen atom, more preferably a group obtained by replacing part of or all of hydrogen atoms of a linear or branched alkylene group having 2 to 5 carbon atoms by a halogen atom, especially preferably a group obtained by replacing one of or all of hydrogen atoms of an ethylene group or a propylene group by a halogen atom.

In the present invention, the term "linear or branched alkylene group having 1 to 6 carbon atoms which may be interrupted by an ester linkage, an amide linkage, an ether linkage, or a phosphodiester linkage" means a "linear or branched alkylene group having 1 to 6 carbon atoms" or "linear or branched alkylene group having 1 to 6 carbon atoms and being interrupted by an ester linkage, an amide linkage, an ether linkage, or a phosphodiester linkage".

Examples of "linear or branched alkylene groups having 1 to 6 carbon atoms" are as mentioned above. The term "linear or branched alkylene group having 1 to 6 carbon atoms which may be interrupted by an ester linkage, an amide linkage, an ether linkage, or a phosphodiester linkage" means a divalent group obtained by replacing at least one methylene ($-CH_2-$) group of the above-mentioned "linear or branched alkylene group having 1 to 6 carbon atoms" by the above-mentioned ester linkage, amide linkage, ether linkage, or phosphodiester linkage.

The term "alkyl group" means a monovalent linear, branched, or cyclic saturated aliphatic hydrocarbon group. Examples of "linear or branched alkyl groups having 1 to 6 carbon atoms" include a methyl group, an ethyl group, a n-propyl group, an isopropyl group, a n-butyl group, an isobutyl group, a s-butyl group, a t-butyl group, a n-pentyl group, a 1-methylbutyl group, a 2-methylbutyl group, a 3-methylbutyl group, a 1,1-dimethylpropyl group, a 1,2-dimethylpropyl group, a 2,2-dimethylpropyl group, a 1-ethylpropyl group, a n-hexyl group, a 1-methylpentyl group, a 2-methylpentyl group, a 3-methylpentyl group, a 1,1-dimethylbutyl group, a 1,2-dimethylbutyl group, a 2,2-dimethylbutyl group, and a 1-ethylbutyl group.

In the present invention, the term "aryl group" means a monovalent monocyclic or polycyclic aromatic hydrocarbon group. The "aryl group" is preferably an aryl group having 6 to 10 carbon atoms, more preferably, for example, a phenyl group, a naphthyl group, or an anthryl group.

In the present invention, the term "aralkyl group having 7 to 16 carbon atoms" means a group obtained by replacing at least one hydrogen atom of the above-mentioned "linear or branched alkyl group having 1 to 6 carbon atoms" by the above-mentioned "aryl group having 6 to 10 carbon atoms", and examples include a benzyl group, a phenethyl group, and an α-methylbenzyl group.

In the present invention, the term "(meth)acrylate compound" means both an acrylate compound and a methacrylate compound. For example, the term "(meth)acrylic acid" means acrylic acid and methacrylic acid.

In the present invention, the terms "cation" and "cationic group" respectively mean cation (positive ion) and cationic group, and include those which are capable of dissociating in water to become a cation or a cationic group. Therefore, the "cationic monovalent organic group" includes a monovalent organic group capable of dissociating in water to become a cationic group. Typical examples of the "cationic monovalent organic groups" include monovalent groups having a primary amine, secondary amine, tertiary amine, or quaternary ammonium structure.

In the present invention, examples of biological substances include proteins, saccharides, nucleic acids, cells, and a combination thereof. Examples of proteins include fibrinogen, bovine serum albumin (BSA), human albumin, various globulins, β-lipoprotein, various antibodies (IgG, IgA, and IgM), peroxidase, various complements, various lectins, fibronectin, lysozyme, von Willebrand factor (vWF), serum γ-globulin, pepsin, egg albumin, insulin, histone, ribonuclease, collagen, and cytochrome c, examples of saccharides include glucose, galactose, mannose, fructose, heparin, and hyaluronic acid, examples of nucleic acids include deoxyribonucleic acid (DNA) and ribonucleic acid (RNA), and examples of cells include fibroblast, myeloid cell, B lymphocyte, T lymphocyte, neutrophil, erythrocyte, platelets, macrophage, monocyte, osteocyte, pericyte, dendritic cell, keratinocyte, fat cell, mesenchymal cell, epithelial cell, epidermal cell, endothelial cell, vascular endothelial cell, hepatic parenchymal cell, chondrocyte, proligerous cumulus cell, nervous system cell, glial cell, neuron, oligodendrocyte, microglia, astroglia, heart cell, esophageal cell, muscle cell (for example, smooth muscle cell or skeletal muscle cell), pancreatic B cell, melanocyte, hemopoietic precursor cell, mononuclear cell, embryonic stem cell (ES cell), embryonal carcinoma cell, embryonic germ stem cell, induced pluripotent stem cell (iPS cell), nerve stem cell, hematopoietic stem cell, mesenchymal stem cell, hepatic stem cell, pancreatic stem cell, muscle stem cell, germ stem cell, intestinal stem cell, cancer stem cell, hair follicle stem cell, and various cell strains (for example, HCT116, Huh7, HEK293 (human fetal renal cell), HeLa (human cervical cancer cell strain), HepG2 (human liver cancer cell strain), UT7/TPO (human leukemia cell strain), CHO (Chinese hamster ovary cell strain), MDCK, MDBK, BHK, C-33A, HT-29, AE-1, 3D9, Ns0/1, Jurkat, NIH3T3, PC12, S2, Sf9, Sf21, High Five, and Vero), and the coating film of the present invention particularly has high ability to inhibit adhesion of platelets. The coating film of the present invention has especially high ability to inhibit adhesion of serum having proteins and saccharides mixed. The coating film of the present invention has especially high ability to inhibit adhesion of cells, particularly embryonic fibroblast. Particularly, the coating film of the present invention has especially high ability to inhibit adhesion of mouse embryonic fibroblast (for example, C3H10T1/2).

The expression "having the ability to inhibit adhesion of biological substances" means that, for example, when the biological substances are a protein, in the QCM-D measurement performed by the method described in the Examples below, the relative mass per unit area (%), as compared to that in the case of no coating film, ((mass per unit area (ng/cm$^2$) in the Example)/(mass per unit area (ng/cm$^2$) in the Comparative Example)) is 50% or less, preferably 30% or less, further preferably 20% or less;
and that when the biological substances are cells, in the observation of cell adhesion by means of a fluorescence microscope performed by the method described in the Examples below, as compared to the control, no adhesion or spread of the cell is found, and the formation of spheroid is observed.

DESCRIPTION OF THE PRESENT INVENTION (Composition for Forming Coating Film)

The composition for forming the coating film of the present invention comprises a copolymer and a solvent, wherein the copolymer is obtained by subjecting a monomer mixture to polymerization, wherein the monomer mixture comprises a compound represented by the following formula (1):

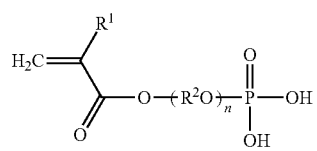

(1)

wherein $R^1$ represents a hydrogen atom or a methyl group, $R^2$ represents an alkylene group having 1 to 6 carbon atoms, and n represents an integer of 1 to 30,
a compound represented by the following formula (2):

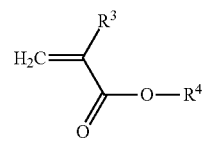

(2)

wherein $R^3$ represents a hydrogen atom or a methyl group, and $R^4$ represents a cationic monovalent organic group,
and a compound represented by the following formula (3):

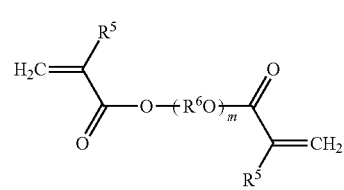

(3)

wherein each $R^5$ independently represents a hydrogen atom or a linear or branched alkyl group having 1 to 6 carbon atoms, $R^6$ represents a linear or branched alkylene group having 1 to 10 carbon atoms which may be substituted with a halogen atom, and m represents an integer of 1 to 30,
wherein the amount of the compound represented by the formula (3) above is 2 to 40% by mass, based on the mass of the monomer mixture.

In the compound of the formula (1), which is a monomer component for the copolymer in the present invention, $R^1$ represents a hydrogen atom or a methyl group, $R^2$ represents an alkylene group having 1 to 6 carbon atoms, preferably a linear or branched alkylene group having 1 to 6 carbon atoms, more preferably a linear or branched alkylene group having 2 to 5 carbon atoms, especially preferably an ethylene group or a propylene group, and n represents an integer of 1 to 30, preferably an integer of 1 to 20, more preferably an integer of 2 to 10, especially preferably an integer of 3 to 6.

Specific examples of the compounds of the formula (1) include acid phosphoxy ethyl (meth)acrylate, 3-chloro-2-acid phosphoxy propyl (meth)acrylate, acid phosphoxy propyl (meth)acrylate, acid phosphoxy methyl (meth)acrylate, acid phosphoxy polyoxyethylene glycol mono(meth)acrylate, and acid phosphoxy polyoxypropylene glycol mono (meth)acrylate, and, of these, acid phosphoxy ethyl methacrylate (=2-(methacryloyloxy)ethyl phosphate), acid phosphoxy polyoxyethylene glycol monomethacrylate, or acid phosphoxy polyoxypropylene glycol monomethacrylate is preferably used.

Structural formulae of acid phosphoxy ethyl methacrylate (=2-(methacryloyloxy)ethyl phosphate), acid phosphoxy polyoxyethylene glycol monomethacrylate, and acid phosphoxy polyoxypropylene glycol monomethacrylate are respectively represented by the following formulae (1-1) to (1-3).

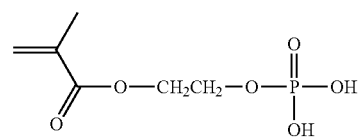

(1-1)

-continued

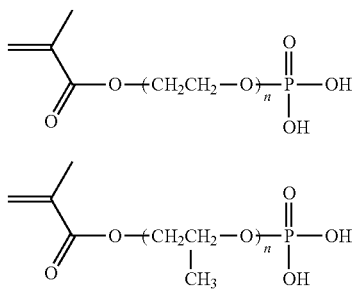

(1-2)

(1-3)

n = 3-6

In the compound of the formula (2), which is a monomer component for the copolymer in the present invention, $R^3$ represents a hydrogen atom or a methyl group, and $R^4$ represents a cationic monovalent organic group, typically, a monovalent group having a primary amine, secondary amine, tertiary amine, or quaternary ammonium structure.

The monovalent groups having a primary amine, secondary amine, tertiary amine, or quaternary ammonium structure mean, for example, groups respectively represented by the formulae: $—R^{4a}—NH_2$, $—R^{4a}—NHR$, $—R^{4a}—NRR'$, and $—R^{4a}—N^+RR'R''$ [wherein $R^{4a}$ is an alkylene group having 1 to 6 carbon atoms which may be interrupted by an ester linkage, an amide linkage, an ether linkage, or a phosphodiester linkage, and each of R, R', and R'' is independently a linear or branched alkyl group having 1 to 6 carbon atoms, an aryl group having 6 to 10 carbon atoms, or an aralkyl group having 7 to 16 carbon atoms]. The monovalent group having a primary amine, secondary amine, or tertiary amine structure in the present invention may be quaternized or chlorinated, and similarly the monovalent group having a quaternary ammonium structure may be chlorinated.

Specific examples of the compounds of the formula (2) include dimethylaminoethyl (meth)acrylate, diethylaminoethyl (meth)acrylate, dimethylaminopropyl (meth)acrylate, 2-(t-butylamino)ethyl (meth)acrylate, (meth)acryloylcholin chloride, and 2-(meth)acryloyloxyethylphosphorylcholin (MPC).

Structural formulae of 2-(dimethylamino)ethyl methacrylate, methacryloylcholin chloride, and 2-methacryloyloxyethylphosphorylcholin (MPC) are respectively represented by the following formulae (2-1) to (2-3).

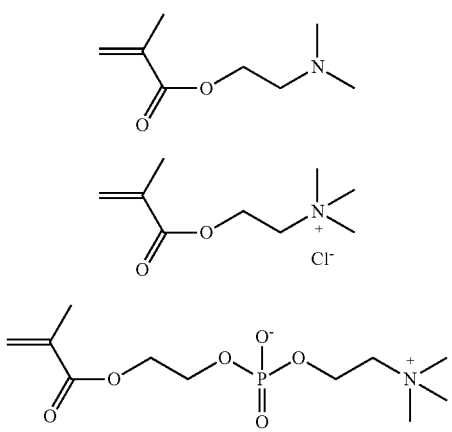

(2-1)

(2-2)

(2-3)

The compound of the formula (3), which is a monomer component for the copolymer in the present invention, is a crosslinkable difunctional monomer. In the compound of the formula (3), each $R^5$ independently represents a hydrogen atom or a linear or branched alkyl group having 1 to 6 carbon atoms, preferably a hydrogen atom or a methyl group, $R^6$ represents a linear or branched alkylene group having 1 to 10 carbon atoms which may be substituted with a halogen atom, preferably a linear or branched alkylene group having 1 to 6 carbon atoms which may be substituted with a halogen atom, more preferably a linear or branched alkylene group having 1 to 6 carbon atoms which may be substituted with a chlorine atom, especially preferably an ethylene group, a propylene group, or a trimethylene group, and m represents an integer of 1 to 30, preferably an integer of 1 to 20, more preferably an integer of 1 to 10, further preferably an integer of 1 to 6, especially preferably an integer of 1 to 4.

Specific examples of the compounds of the formula (3) include poly(ethylene glycol)di(meth)acrylate, poly(trimethylene glycol)di(meth)acrylate, and poly(propylene glycol)di(meth)acrylate.

Structural formulae of poly(ethylene glycol) dimethacrylate, poly(trimethylene glycol) dimethacrylate, and poly (propylene glycol) dimethacrylate are respectively represented by the following formulae (3-1) to (3-3).

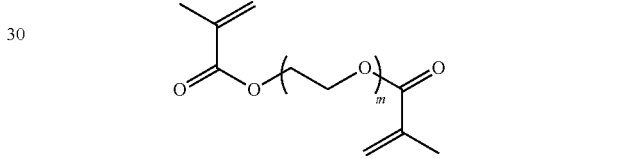

(3-1)

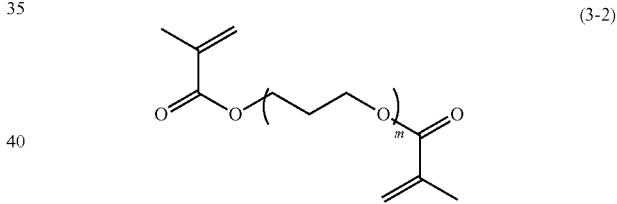

(3-2)

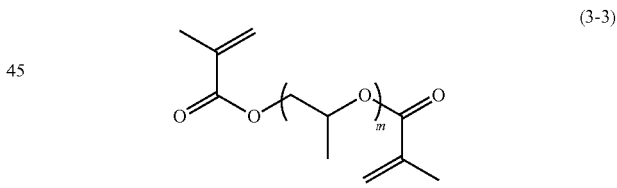

(3-3)

m = 1-6

The copolymer in the present invention is obtained by subjecting to polymerization a monomer mixture comprising the compounds of the formulae (1), (2), and (3) above, which are monomer components. The monomer mixture may contain, as an optional fourth component, an ethylenically unsaturated monomer, a polysaccharide, or a derivative thereof in such an amount that the effects of the present invention (i.e., the ability to inhibit adhesion of biological substances, and others) are not sacrificed. Examples of ethylenically unsaturated monomers include one or two or more ethylenically unsaturated monomers selected from the group consisting of (meth)acrylic acid and esters thereof; vinyl acetate; vinylpyrrolidone; ethylene; vinyl alcohol; and hydrophilic functional derivatives thereof. Examples of polysaccharides or derivatives thereof include cellulose polymers, such as hydroxyalkyl cellulose (for example, hydroxyethyl cellulose and hydroxypropyl cellulose), starch, dextran, and curdlan. The copolymer in the present invention is preferably obtained by subjecting to polymerization a monomer mixture comprising only the compounds of the formulae (1), (2), and (3) above as monomer components.

The copolymer in the present invention is obtained by subjecting a monomer mixture to polymerization, wherein the monomer mixture comprises the compounds of the formulae (1), (2), and (3) above, which are monomer components, and wherein the amount of the compound of the formula (3) is 2 to 40% by mass, based on the total mass of the monomer components contained in the monomer mixture. When the compound of the formula (3) which is a difunctional monomer is contained in an amount in the range of from 2 to 40% by mass, preferably in the range of from 3 to 35% by mass, more preferably in the range of from 5 to 30% by mass, based on the total mass of the monomer components contained in the monomer mixture, the composition for forming the coating film of the present invention containing a copolymer obtained from the monomer mixture can achieve excellent ability to inhibit adhesion of biological substances. The monomer mixture may contain two or more compounds of the formula (3).

In the monomer mixture, the amount of the compound of the formula (1) is 10 to 95% by mass, preferably 10 to 80% by mass, further preferably 45 to 75% by mass, based on the total mass of the monomer components. The monomer mixture may contain two or more compounds of the formula (1).

In the monomer mixture, the amount of the compound of the formula (2) is 3 to 90% by mass, preferably 10 to 70% by mass, further preferably 15 to 35% by mass, based on the total mass of the monomer components. The monomer mixture may contain two or more compounds of the formula (2).

The copolymer in the present invention can be synthesized by, for example, a radical polymerization, anionic polymerization, or cationic polymerization method which is a general synthesis method for (a)an (meth)acrylic polymer. The polymerization can be conducted by various methods, such as solution polymerization, suspension polymerization, emulsion polymerization, and bulk polymerization. In an embodiment, the copolymer can be prepared by a method which comprises the step of subjecting a monomer mixture comprising the compounds of the formulae (1), (2), and (3) above to reaction (polymerization) in a solvent so that the concentration of the total of the monomer components is 0.01 to 20% by mass.

The solvent used in the polymerization reaction may be water, a phosphate buffer, an alcohol, such as ethanol, or a mixed solvent containing a combination thereof, but the solvent desirably contains water or ethanol. Further, the solvent preferably contains water or ethanol in an amount of 10 to 100% by mass. Further, the solvent preferably contains water or ethanol in an amount of 50 to 100% by mass. Further, the solvent preferably contains water or ethanol in an amount of 80 to 100% by mass. Further, the solvent preferably contains water or ethanol in an amount of 90 to 100% by mass. The total amount of water and ethanol in the solvent is preferably 100% by mass.

For efficiently advancing the polymerization reaction, a polymerization initiator is desirably used. Examples of polymerization initiators include a "thermal radical polymerization initiator" and a "photo radical polymerization initiator".

Examples of "thermal radical polymerization initiators" include 2,2'-azobis(isobutyronitrile), 2,2'-azobis(2-methylbutyronitrile), 2,2'-azobis(2,4-dimethylvaleronitrile) (product name: V-65, manufactured by FUJIFILM Wako Pure Chemical Corporation; 10-hour half-period temperature: 51° C.), 4,4'-azobis(4-cyanovaleric acid), 2,2'-azobis(4-methoxy-2,4-dimethylvaleronitrile), 1,1'-azobis(cyclohexane-1-carbonitrile), 1-[(1-cyano-1-methylethyl)azo]formamide, 2,2'-azobis[2-(2-imidazolin-2-yl)propane] dihydrochloride (VA-044, manufactured by FUJIFILM Wako Pure Chemical Corporation; 10-hour half-period temperature: 44° C.), 2,2'-azobis[2-(2-imidazolin-2-yl)propane] (VA-061, manufactured by FUJIFILM Wako Pure Chemical Corporation; 10-hour half-period temperature: 61° C.), 2,2'-azobis(2-methylpropionamidine) dihydrochloride, 2,2'-azo(2-methyl-N-(2-hydroxyethyl)propionamide (product name: VA-086, manufactured by FUJIFILM Wako Pure Chemical Corporation; 10-hour half-period temperature: 86° C.), benzoyl peroxide (BPO), 2,2'-azobis(N-(2-carboxyethyl)-2-methylpropionamidine) n-hydrate (product name: VA-057, manufactured by FUJIFILM Wako Pure Chemical Corporation; 10-hour half-period temperature: 57° C.), 4,4'-azobis(4-cyanopentanoic acid) (product name: VA-501, manufactured by FUJIFILM Wako Pure Chemical Corporation), 2,2'-azobis[2-(2-imidazolin-2-yl)propane]disulfate dihydrate (product name: VA-046B, manufactured by FUJIFILM Wako Pure Chemical Corporation; 10-hour half-period temperature: 46° C.), 2,2'-azobis(2-amidinopropane) dihydrochloride (product name: V-50, manufactured by FUJIFILM Wako Pure Chemical Corporation; 10-hour half-period temperature: 56° C.), peroxodisulfuric acid, t-butyl hydroperoxide, and dimethyl 1,1'-azobis(1-cyclohexanecarboxylate) (product name: VE-073, manufactured by FUJIFILM Wako Pure Chemical Corporation).

Examples of "photo radical polymerization initiators" include acetophenones, such as acetophenone, chloroacetophenone, hydroxyacetophenone, 2-aminoacetophenone, dialkylaminoacetophenone, 2,2-diethoxyacetophenone, 2,2-dimethoxy-2'-phenylacetophenone (product name: Irgacure 651, manufactured by BASF AG), 2-hydroxy-2-methyl-1-phenylpropanone (product name: Irgacure 1173, manufactured by BASF AG), 1-[4-(2-hydroxyethoxy)-phenyl]-2-hydroxymethylpropanone (product name: Irgacure 2959, manufactured by BASF AG), 2-hydroxy-1-{4-[4-(2-hydroxy-2-methylpropionyl)benzyl]phenyl}-2-methyl-1-propan-1-one (product name: Irgacure 127, manufactured by BASF AG), 2-methyl-1-[4-(methylthio)phenyl]-2-morpholinopropan-1-one (product name: Irgacure 907, manufactured by BASF AG), and 2-benzyl-2-(dimethylamino)-4-morpholinobutyrophenone (product name: Irgacure 369, manufactured by BASF AG); benzoins, such as benzoin, benzoin methyl ether, benzoin ethyl ether, benzoin isopropyl ether, benzoin isobutyl ether, and 1-hydroxycyclohexyl phenyl ketone (product name: Irgacure 184, manufactured by BASF AG); benzophenones, such as benzophenone, benzoylbenzoic acid, methyl benzoylbenzoate, methyl o-benzoylbenzoate, 4-phenylbenzophenone, hydroxybenzophenone, hydroxypropylbenzophenone, acrylbenzophenone, 4,4'-bis(dimethylamino)benzophenone, and 4,4'-dichlorobenzophenone; thioxanthones, such as thioxanthone, 2-chlorothioxanthone, 2-methylthioxanthone, diethylthioxanthone, and dimethylthioxanthone; acylphosphine oxides, such as 2,4,6-trimethylbenzoyl-diphenylphosphine oxide (product name: Irgacure TPO, manufactured by BASF AG) and bis(2,4,6-trimethylbenzoyl)-phenylphosphine oxide (product name: Irgacure 819, manufactured by BASF AG); a mixture of oxyphenylacetic acid 2-[2-oxo-2-phenylacetoxyethoxy]

ethyl ester and oxyphenylacetic acid 2-(2-hydroxyethoxy) ethyl ester (product name: Irgacure 754, manufactured by BASF AG), methyl benzoylformate (product name: Irgacure MBF, manufactured by BASF AG), α-acyloxime ester, benzyl-(o-ethoxycarbonyl)-α-monooxime, glyoxy ester, 2-ethylanthraquinone, camphorquinone, tetramethylthiuram sulfide, azobisisobutyronitrile, benzoyl peroxide, dialkyl peroxide, and tert-butyl peroxypivalate.

Taking into consideration the solubility in water, ion balance, and interaction with the monomers, the polymerization initiator is preferably selected from 2,2'-azo(2-methyl-N-(2-hydroxyethyl)propionamide, 2,2'-azobis(N-(2-carboxyethyl)-2-methylpropionamidine) n-hydrate, 4,4'-azobis(4-cyanopentanoic acid), 2,2'-azobis[2-(2-imidazolin-2-yl)propane]dihydrochloride, 2,2'-azobis[2-(2-imidazolin-2-yl)propane]disulfate dihydrate, 2,2'-azobis[2-(2-imidazolin-2-yl)propane], 2,2'-azobis(2-amidinopropane) dihydrochloride, and peroxodisulfuric acid.

Taking into consideration the solubility in an organic solvent, ion balance, and interaction with the monomers, 2,2'-azobis(2,4-dimethylvaleronitrile) or 2,2'-azobis(isobutyronitrile) is desirably used.

The amount of the polymerization initiator added is 0.05 to 10% by mass, based on the total mass of the monomer components used in the polymerization.

With respect to the reaction conditions, a reaction vessel in, for example, an oil bath is heated to 50 to 200° C. and stirring is conducted for 1 to 48 hours, more preferably, stirring is conducted at 80 to 150° C. for 5 to 30 hours to cause the polymerization reaction to proceed, obtaining the copolymer in the present invention. The reaction atmosphere is preferably a nitrogen gas atmosphere.

A procedure for the reaction may be employed in which all the reactants are added to a reaction solvent at room temperature and then the resultant mixture is heated to the above-mentioned temperature to cause polymerization, or in which all of or part of a mixture of the reactants is slowly dropwise added to a preheated solvent.

The copolymer in the present invention may have a weight average molecular weight of about several thousand to several million, preferably 5,000 to 5,000,000, more preferably 10,000 to 2,000,000. Further, the copolymer may be any of a random copolymer, a block copolymer, and a graft copolymer, and is preferably a random copolymer.

Further, the copolymer produced as mentioned above contains a difunctional monomer, and therefore is considered to be a three-dimensional polymer, and is in the state of being dissolved or dispersed in a solution containing water or an alcohol.

The composition for forming the coating film of the present invention may be prepared by isolating/purifying the thus obtained copolymer and then diluting the resultant copolymer with a desired solvent to a predetermined concentration.

Further, the composition for forming the coating film of the present invention may be prepared from the reaction solution (i.e., copolymer-containing varnish) obtained after the polymerization reaction.

As examples of the solvent contained in the composition for forming the coating film of the present invention, there can be mentioned water, phosphate buffered saline (PBS), and an alcohol. Examples of alcohols include alcohols having 2 to 6 carbon atoms, such as ethanol, propanol, isopropanol, 1-butanol, 2-butanol, isobutanol, t-butanol, 1-pentanol, 2-pentanol, 3-pentanol, 1-heptanol, 2-heptanol, 2,2-dimethyl-1-propanol (=neopentyl alcohol), 2-methyl-1-propanol, 2-methyl-1-butanol, 2-methyl-2-butanol (=t-amyl alcohol), 3-methyl-1-butanol, 3-methyl-3-pentanol, cyclopentanol, 1-hexanol, 2-hexanol, 3-hexanol, 2,3-dimethyl-2-butanol, 3,3-dimethyl-1-butanol, 3,3-dimethyl-2-butanol, 2-ethyl-1-butanol, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, 4-methyl-3-pentanol, and cyclohexanol, and these solvents may be used individually or in combination (mixed solvent), but, from the viewpoint of dissolving the copolymer, the solvent is preferably selected from water, PBS, ethanol, and propanol.

The composition for forming the coating film of the present invention desirably has a solids content of 0.01 to 50% by mass for forming a uniform coating film. Further, the concentration of the copolymer in the composition for forming the coating film is preferably 0.01 to 5% by mass, more preferably 0.01 to 4% by mass, especially preferably 0.01 to 3% by mass. When the concentration of the copolymer is 0.01% by mass or less, the obtained composition for forming the coating film has such a low copolymer concentration that a coating film having a satisfactory thickness cannot be formed, and, when the concentration of the copolymer is 5% by mass or more, the composition for forming the coating film is likely to have poor storage stability, leading to deposition of the dissolved material or gelation.

Further, in the composition for forming the coating film of the present invention, in addition to the above-mentioned copolymer and solvent, if necessary, an additional substance can be added in such an amount that the performance of the obtained coating film is not sacrificed. Examples of additional substances include an antiseptic agent, a surfactant, a primer for improving the adhesion to a substrate, a mildew-proofing agent, and saccharides.

For controlling the ion balance of the copolymer in the composition for forming the coating film of the present invention, the step of preliminarily adjusting the pH of the composition for forming the coating film may be further conducted when obtaining the coating film of the present invention. Adjustment of the pH may be conducted by, for example, adding a pH adjustor to the composition containing the above-mentioned copolymer and solvent to adjust the pH of the composition to 2 to 13.5, preferably 2 to 8.5, further preferably 3 to 8, or preferably 8.5 to 13.5, further preferably 10 to 13.5. The type and amount of the usable pH adjustor are appropriately selected according to, for example, the concentration of the copolymer or the ratio of the anions and cations present in the copolymer.

Examples of pH adjustors include ammonia, organic amines, such as diethanolamine, pyridine, N-methyl-D-glucamine, and tris(hydroxymethyl)aminomethane; alkali metal hydroxides, such as potassium hydroxide and sodium hydroxide; alkali metal halides, such as potassium chloride and sodium chloride; inorganic acids, such as sulfuric acid, phosphoric acid, hydrochloric acid, and carbonic acid, and alkali metal salts thereof; quaternary ammonium cations, such as cholin, and a mixture thereof (for example, a buffer, such as phosphate buffered saline). Of these, preferred are ammonia, diethanolamine, sodium hydroxide, cholin, N-methyl-D-glucamine, and tris(hydroxymethyl)aminomethane, and especially preferred are ammonia, diethanolamine, sodium hydroxide, and cholin.

(Coating Film)

The coating film of the present invention can be formed by applying the composition for forming the coating film of the present invention to a substrate and drying the applied composition.

Examples of materials for the substrate on which the coating film of the present invention is formed include glass, a metal-containing compound or semi-metal-containing compound, activated carbon, and a resin. Examples of metal-containing compounds or semi-metal-containing compounds include ceramics which are a sintered material that contains a metal oxide as a basic component and is sintered by a heat treatment at a high temperature, semiconductors, such as silicon, inorganic solid materials, e.g., a shaped article of an inorganic compound, such as a metal oxide or semi-metal oxide (such as silicon oxide or alumina), a metal carbide or semi-metal carbide, a metal nitride or semi-metal nitride (such as silicon nitride), or a metal boride or semi-metal boride, aluminum, nickel, titanium, and stainless steel (such as SUS 304, SUS 316, and SUS 316L).

The resin may be either a natural resin or a synthetic resin, and, with respect to the natural resin, for example, cellulose, cellulose triacetate (CTA), or cellulose having dextran sulfate fixed thereto is preferably used, and, with respect to the synthetic resin, there is preferably used, for example, polyacrylonitrile (PAN), polyester polymer alloy (PEPA), polystyrene (PS), polysulfone (PSF), polyethylene terephthalate (PET), polymethyl methacrylate (PMMA), polyvinyl alcohol (PVA), polyurethane (PU), ethylene vinyl alcohol (EVAL), polyethylene (PE), polyester (PE), polypropylene (PP), polyvinylidene fluoride (PVDF), polyether sulfone (PES), polycarbonate (PC), polyvinyl chloride (PVC), polytetrafluoroethylene (PTFE), ultra high molecular weight polyethylene (UHPE), polydimethylsiloxane (PDMS), an acrylonitrile-butadiene-styrene resin (ABS), Teflon (registered trademark), a cycloolefin polymer (COP) (for example, ZEONOR (registered trademark), ZEONEX (registered trademark) (manufactured by Zeon Corporation), or various types of ion-exchange resins, but more preferred are polystyrene (PS), polyether sulfone (PES), polypropylene (PP), and a cycloolefin polymer (COP), and especially preferred are polystyrene (PS) and polyether sulfone (PES). The coating film of the present invention can be formed by drying at low temperatures, and therefore can be applied to, for example, a resin having poor heat resistance.

With respect to the form of the substrate of the present invention, there is no particular limitation, and examples include a fiber form, a particle form, a gel form, and a porous form, and the substrate may have a shape of flat plate or curved surface.

For forming the coating film of the present invention, the above-mentioned composition for forming the coating film is applied to at least part of the surface of a substrate. With respect to the method for application, there is no particular limitation, and an application method, such as a general spin coating, dip coating, or solvent casting method, is used.

The drying step for the coating film of the present invention is conducted in air or a vacuum preferably at a temperature in the range of from −200 to 200° C. By the drying step, the solvent in the above-mentioned composition for forming the coating film is removed, and further it is considered that the anionic group and cationic group of the compounds of the formulae (1) and (2) in the copolymer in the present invention form an ionic bond, so that the coating film is completely fixed to the substrate.

The coating film can be formed by drying, for example, at room temperature (10 to 35° C., for example, 25° C.), but, for more quickly forming the coating film, for example, drying at 40 to 80° C. may be conducted. Alternatively, the drying step according to a freeze-drying method at an extremely low temperature to a low temperature (about −200 to −30° C.) may be employed. Freeze-drying is also called vacuum freeze-drying that is a method in which generally, a dried material is cooled by a coolant and the solvent is removed by sublimation in a vacuum state. Examples of general coolants used in freeze-drying include a mixed medium of dry ice and methanol (−78° C.) and liquid nitrogen (−196° C.).

When the drying temperature is −200° C. or lower, there are disadvantages in that a coolant which is not common must be used and the general-purpose properties are poor, and in that sublimation of the solvent requires such a long drying time that the efficiency is reduced. When the drying temperature is 200° C. or higher, an ionic bonding reaction on the surface of the coating film excessively proceeds to cause the surface to lose hydrophilicity, so that the coating film cannot exhibit the ability to inhibit adhesion of biological substances. A more preferred drying temperature is 10 to 180° C., and a more preferred drying temperature is 25 to 150° C.

After drying, for removing impurities, unreacted monomers and others remaining on the coating film, and further for controlling the ion balance of the copolymer in the film, the step of cleaning the coating film with at least one solvent selected from water and an aqueous solution containing an electrolyte may be performed. The cleaning is desirably, for example, cleaning with running water or ultrasonic cleaning. The above-mentioned water and aqueous solution containing an electrolyte may be those which are heated to a temperature, for example, in the range of from 40 to 95° C. With respect to the aqueous solution containing an electrolyte, preferred are PBS, a physiological salt solution (containing only sodium chloride), a Dulbecco phosphate buffered physiological salt solution, a Tris buffered physiological salt solution, a HEPES buffered physiological salt solution, and a veronal buffered physiological salt solution, and especially preferred is PBS. After being fixed to a substrate, the coating film is not dissolved even when cleaned with, for example, water, PBS, or an alcohol and remains firmly fixed to the substrate. The formed coating film is advantageous in that even when biological substances adhere to the coating film, the substances can be then easily removed from the coating film by, for example, washing with water, and the surface of the substrate having formed thereon the coating film of the present invention has the ability to inhibit adhesion of biological substances.

The coating film of the present invention preferably has a thickness of 10 to 1,000 Å, more preferably 10 to 500 Å, further preferably 30 to 500 Å.

If necessary, the coating film of the present invention may be subjected to treatment for sterilization using, for example, a γ-ray, ethylene oxide, or an autoclave.

The coating film of the present invention has the ability to inhibit adhesion of biological substances, and therefore can be advantageously used as a coating film for substrate for medical use. Accordingly, a specific embodiment of the substrate includes, for example, a leukocyte removing filter, a blood transfusion filter, a virus removing filter, a blood microaggregates removing filter, a blood purification module, an artificial heart, an artificial lung, a blood circuit, an artificial blood vessel, blood vessel bypass tubing, medical tubing, an artificial valve, a cannula, a stent, a catheter, an intravascular catheter, a balloon catheter, a guide wire, a suture thread, an indwelling needle, shunt, an artificial joint, an artificial hip joint, a blood bag, a blood storing container, a surgical auxiliary instrument, an adhesion preventing film, and an injury protector. The blood purification module means a module having a function such that blood is subjected to extracorporeal circulation to remove waste substances and harmful substances in the blood, and examples include an artificial kidney and a toxin adsorbing filter or column.

For example, a filter for artificial dialysis apparatus having the coating film of the present invention can be prepared by passing the composition for forming the coating film of the present invention through the inside of a filter which is formed from the above-mentioned material, and which is, for example, in the form of a hollow yarn having a diameter of 0.1 to 500 μm, and then subjecting the resultant filter to the drying step and cleaning step (for example, cleaning with hot water (for example, at 40 to 95° C.)).

Another specific embodiment of the substrate includes, for example, cell culture containers, such as a flask, a dish, and a plate, various instruments for study which are inhibited in adhesion of protein, and devices for diagnostic drug for biochemical study. That is, the composition for forming the coating film of the present invention can also be advantageously used as a blocking agent for inhibiting nonspecific adsorption in an enzyme-linked immunosorbent assay (ELISA) method or latex agglutination method widely used as a clinical diagnosis method, or a stabilizer for stabilizing a protein, such as an enzyme or an antibody.

Further another specific embodiment of the substrate includes, for example, toiletries, articles for personal hygiene, cosmetics, and contact lens care articles.

EXAMPLES

Hereinbelow, the present invention will be described in more detail with reference to the following Examples and others, which should not be construed as limiting the scope of the present invention.

<Method for Measuring a Purity of a Monomer>

An absolute mass % (purity) of the acid phosphoxy polypropylene glycol monomethacrylate (average addition molar number of propylene oxide: 5) (product name: PPM-5P, manufactured by Toho Chemical Industry Co., Ltd.) used in the Synthesis Examples below was determined by conducting a compositional analysis of a phosphorus-containing compound using $^{31}$P-NMR measurement, and making conversion using a molecular weight when the addition molar number of the acid phosphoxy polypropylene glycol monomethacrylate (average addition molar number of propylene oxide: 5) was taken as 5.

(Conditions for $^{31}$P-NMR Measurement)
    Apparatus: AVANCE III HD (500 MHz)
    Solvent: Deuterated acetone
    Measurement temperature: Room temperature (23° C.)
    Measurement conditions: Non-decoupling method
    Measurement data points: 131072 (128 k)
    Pulse width: 90° pulse (14 μsec.)
    Measuring range: −50 to 10 ppm
    Number of accumulation: 256 times <Method for Measuring a Molecular Weight of a Copolymer>

The weight average molecular weight of the copolymer shown in the Synthesis Examples below is a value as measured by gel filtration chromatography (hereinafter, referred to simply as "GFC").

(Conditions for GFC Measurement)
    Apparatus: HLC-8320GPC (manufactured by Tosoh Corp.) or
    LC-20AD (manufactured by Shimadzu Corporation)
    GFC Columns: TSKgel GMPWXL (7.8 mm ID×30 cm)×2 to 3 columns
    Eluent: Ionic substance-containing aqueous solution, or mixed solution of EtOH (ethanol)
    Column temperature: 40° C.
    Detector: RI
    Concentration at injection: Polymer solids content: 0.05 to 0.5%
    Amount of sample per injection: 10 to 100 μL
    Calibration curve: Cubic approximation curve
    Standard sample: Polyethylene oxide or sodium polystyrenesulfonate Synthesis Example 1

10.59 g of ethanol was added to 1.38 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass) to well dissolve the monomethacrylate. Then, 0.46 g of 2-(dimethylamino) ethyl methacrylate (manufactured by Tokyo Chemical Industry Co., Ltd.), 0.10 g (% by mass, based on the mass of the copolymer: 5.2% by mass) of polyethylene glycol dimethacrylate (average addition molar number of polyethylene glycol: 4) (product name: BLEMMER (registered trademark) PDE-200, manufactured by NOF Corporation), and 7.03 g of pure water were added and the resultant mixture was well stirred. 9.6 mg of dimethyl 1,1'-azobis(1-cyclohexanecarboxylate) (product name: VE-073, manufactured by FUJIFILM Wako Pure Chemical Corporation) was added. A 100 mL flask containing a mixture having all the above materials, which had been well stirred and uniform, was purged with nitrogen gas, and the temperature of the mixture was increased to the reflux temperature while stirring (oil bath temperature: set at 95° C.). The mixture was heated while stirring for 24 hours in the state in which the above-mentioned environment was maintained, obtaining a copolymer-containing varnish having a solids content of about 11.52% by mass. The obtained liquid had a weight average molecular weight of about 440,000, as measured by GFC.

Synthesis Example 2

11.31 g of ethanol was added to 1.40 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass) to well dissolve the monomethacrylate. Then, 0.47 g of 2-(dimethylamino) ethyl methacrylate (manufactured by Tokyo Chemical Industry Co., Ltd.), 0.23 g (% by mass, based on the mass of the copolymer: 11.0% by mass) of polyethylene glycol dimethacrylate (average addition molar number of polyethylene glycol: 4) (product name: BLEMMER (registered trademark) PDE-200, manufactured by NOF Corporation), and 7.62 g of pure water were added and the resultant mixture was well stirred. 10.5 mg of dimethyl 1,1'-azobis (1-cyclohexanecarboxylate) (product name: VE-073, manufactured by FUJIFILM Wako Pure Chemical Corporation) was added. A 100 mL flask containing a mixture having all the above materials, which had been well stirred and uniform, was purged with nitrogen gas, and the temperature of the mixture was increased to the reflux temperature while stirring (oil bath temperature: set at 95° C.). The mixture was heated while stirring for 24 hours in the state in which the above-mentioned environment was maintained, obtaining a copolymer-containing varnish having a solids content of about 10.52% by mass. The obtained liquid had a weight average molecular weight of about 610,000, as measured by GFC.

Synthesis Example 3

5.0 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 1.8 g (% by mass, based on the mass of the copolymer: 21.2% by mass) of polyethylene glycol dimethacrylate (average addition molar number of polyethylene glycol: 4) (product name: BLEMMER (registered trademark) PDE-200, manufactured by NOF Corporation), 1.7 g of 2-(dimethylamino)ethyl methacrylate (manufactured by Mitsubishi Gas Chemical Company, Inc.), 42.7 mg of dimethyl 1,1'-azobis(1-cyclohexanecarboxylate) (product name: VE-073, manufactured by FUJIFILM Wako Pure Chemical Corporation), and 18.5 g of ethanol (manufactured by Kanto Chemical Co., Inc.) were mixed together and uniformly stirred to prepare a mixture. Separately, 30.9 g of ion-exchanged water and 27.8 g of ethanol (manufactured by Kanto Chemical Co., Inc.) were placed in a three-necked flask equipped with a condenser, and increased in temperature to the reflux temperature while stirring. While maintaining this state, the above-prepared mixture was dropwise added to the boiling liquid of ion-exchanged water by a dropping pump through a Teflon (registered trademark) tube over one hour. After the addition, the resultant mixture was heated while stirring for 23 hours in the state in which the above-mentioned environment was maintained. After completion of the reaction, the mixture was cooled to obtain 58 g of a copolymer-containing solution having a solids content of about 9.75% by mass. The obtained liquid had a weight average molecular weight of about 300,000, as measured by GFC.

Synthesis Example 4

3.4 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 2.1 g (% by mass, based on the mass of the copolymer: 31.3% by mass) of polyethylene glycol dimethacrylate (average addition molar number of polyethylene glycol: 4) (product name: BLEMMER (registered trademark) PDE-200, manufactured by NOF Corporation), 1.2 g of 2-(dimethylamino)ethyl methacrylate (manufactured by Mitsubishi Gas Chemical Company, Inc.), 33.4 mg of dimethyl 1,1'-azobis(1-cyclohexanecarboxylate) (product name: VE-073, manufactured by FUJIFILM Wako Pure Chemical Corporation), and 24.2 g of ethanol (manufactured by Kanto Chemical Co., Inc.) were mixed together and uniformly stirred to prepare a mixture. Separately, 24.2 g of ion-exchanged water and 12.1 g of ethanol (manufactured by Kanto Chemical Co., Inc.) were placed in a three-necked flask equipped with a condenser, and increased in temperature to the reflux temperature while stirring. While maintaining this state, the above-prepared mixture was dropwise added to the boiling liquid of ion-exchanged water by a dropping pump through a Teflon (registered trademark) tube over one hour. After the addition, the resultant mixture was heated while stirring for 23 hours in the state in which the above-mentioned environment was maintained. After completion of the reaction, the mixture was cooled to obtain 55 g of a copolymer-containing solution having a solids content of about 10.43% by mass. The obtained liquid had a weight average molecular weight of about 320,000, as measured by GFC.

Synthesis Example 5

4.0 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.39 g (% by mass, based on the mass of the copolymer: 6.7% by mass) of ethylene glycol dimethacrylate (manufactured by Tokyo Chemical Industry Co., Ltd.), 1.4 g of 2-(dimethylamino)ethyl methacrylate (manufactured by Mitsubishi Gas Chemical Company, Inc.), 0.17 g of dimethyl 1,1'-azobis(1-cyclohexanecarboxylate) (product name: VE-073, manufactured by FUJIFILM Wako Pure Chemical Corporation), and 21.4 g of ethanol (manufactured by Kanto Chemical Co., Inc.) were mixed together and uniformly stirred to prepare a mixture. Separately, 21.4 g of ion-exchanged water and 10.7 g of ethanol (manufactured by Kanto Chemical Co., Inc.) were placed in a three-necked flask equipped with a condenser, and increased in temperature to the reflux temperature while stirring. While maintaining this state, the above-prepared mixture was dropwise added to the boiling liquid of ion-exchanged water by a dropping pump through a Teflon (registered trademark) tube over one hour. After the addition, the resultant mixture was heated while stirring for 23 hours in the state in which the above-mentioned environment was maintained. After completion of the reaction, the mixture was cooled to obtain 50 g of a copolymer-containing solution having a solids content of about 9.91% by mass. The obtained liquid had a weight average molecular weight of about 230,000, as measured by GFC.

Synthesis Example 6

2.47 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.57 g (% by mass, based on the mass of the copolymer: 15.6% by mass) of triethylene glycol dimethacrylate (manufactured by Tokyo Chemical Industry Co., Ltd.), 0.62 g of 2-(dimethylamino)ethyl methacrylate (manufactured by Tokyo Chemical Industry Co., Ltd.), 19.1 mg of dimethyl 1,1'-azobis(1-cyclohexanecarboxylate) (product name: VE-073, manufactured by FUJIFILM Wako Pure Chemical Corporation), 6.5 g of isopropyl alcohol (manufactured by Junsei Chemical Co., Ltd.), and 10.0 g of pure water were mixed together and uniformly stirred to prepare a mixture. Separately, 9.7 g of pure water and 6.6 g of isopropyl alcohol (manufactured by Junsei Chemical Co., Ltd.) were placed in a three-necked flask equipped with a condenser, and increased in temperature to the reflux temperature while stirring. While maintaining this state, the above-prepared mixture was dropwise added to the boiling liquid of the lower layer by a dropping funnel over one hour. After the addition, the resultant mixture was heated while stirring for 23 hours in the state in which the above-mentioned environment was maintained. After completion of the reaction, the mixture was cooled to obtain a copolymer-containing solution having a solids content of about 13.16% by mass. The obtained liquid had a weight average molecular weight of about 83,000, as measured by GFC.

Synthesis Example 7

20.01 g of ethanol was added to 2.28 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass) to well dissolve the monomethacrylate. Then, 1.03 g of an 80% aqueous solution of methacryloylcholin chloride (manufactured by Tokyo Chemical Industry Co., Ltd.), 0.37 g (% by mass, based on the mass of the copolymer: 10.7% by mass) of polyethylene glycol dimethacrylate (average addition molar number of polyethylene glycol: 4) (product name: BLEMMER (registered trademark) PDE-200, manufactured by NOF Corporation), and 13.38 g of pure water were added and the resultant mixture was well stirred. 18.4 mg of dimethyl 1,1'-azobis(1-cyclohexanecarboxylate) (product name: VE-073, manufactured by FUJIFILM Wako Pure Chemical Corporation) was added. A 100 mL flask containing a mixture having all the above materials, which had been well stirred and uniform, was purged with nitrogen gas, and the temperature of the mixture was increased to the reflux temperature while stirring. The mixture was heated while stirring for 24 hours in the state in which the above-mentioned environment was maintained, obtaining a copolymer-containing varnish having a solids content of about 9.39% by mass. The obtained liquid had a weight average molecular weight of about 140,000, as measured by GFC.

Synthesis Example 8

3.5 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.34 g (% by mass, based on the mass of the copolymer: 6.3% by mass) of ethylene glycol dimethacrylate (manufactured by Tokyo Chemical Industry Co., Ltd.), 2.0 g of an 80% aqueous solution of methacryloylcholin chloride (manufactured by Tokyo Chemical Industry Co., Ltd.), 29.1 mg of dimethyl 1,1'-azobis(1-cyclohexanecarboxylate) (product name: VE-073, manufactured by FUJIFILM Wako Pure Chemical Corporation), and 21.1 g of ethanol (manufactured by Kanto Chemical Co., Inc.) were mixed together and uniformly stirred to prepare a mixture. Separately, 21.1 g of ion-exchanged water and 10.5 g of ethanol (manufactured by Kanto Chemical Co., Inc.) were placed in a three-necked flask equipped with a condenser, and increased in temperature to the reflux temperature while stirring. While maintaining this state, the above-prepared mixture was dropwise added to the boiling liquid of ion-exchanged water by a dropping pump through a Teflon (registered trademark) tube over one hour. After the addition, the resultant mixture was heated while stirring for 23 hours in the state in which the above-mentioned environment was maintained. After completion of the reaction, the mixture was cooled to obtain 48 g of a copolymer-containing solution having a solids content of about 9.56% by mass. The obtained liquid had a weight average molecular weight of about 36,000, as measured by GFC.

Synthesis Example 9

1.37 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.52 g (% by mass, based on the mass of the copolymer: 18.8% by mass) of polyethylene glycol dimethacrylate (average addition molar number of polyethylene glycol: 4) (product name: BLEMMER (registered trademark) PDE-200, manufactured by NOF Corporation), 0.88 g of 2-methacryloyloxyethylphosphorylcholin (MPC, manufactured by Tokyo Chemical Industry Co., Ltd.), 12.4 mg of dimethyl 1,1'-azobis(1-cyclohexanecarboxylate) (product name: VE-073, manufactured by FUJIFILM Wako Pure Chemical Corporation), 6.09 g of ethanol (manufactured by Kanto Chemical Co., Inc.), and 6.08 g of pure water were mixed together and uniformly stirred to prepare a mixture. Separately, 6.42 g of pure water and 6.55 g of ethanol (manufactured by Kanto Chemical Co., Inc.) were placed in a three-necked flask equipped with a condenser, and increased in temperature to the reflux temperature while stirring. While maintaining this state, the above-prepared mixture was dropwise added to the boiling liquid of the lower layer by a dropping funnel over one hour. After the addition, the resultant mixture was heated while stirring for 23 hours in the state in which the above-mentioned environment was maintained. After completion of the reaction, the mixture was cooled to obtain a copolymer-containing solution having a solids content of about 16.31% by mass. The obtained liquid had a weight average molecular weight of about 520,000, as measured by GFC.

Synthesis Example 10

0.28 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.61 g (% by mass, based on the mass of the copolymer: 24.4% by mass) of polyethylene glycol dimethacrylate (average addition molar number of polyethylene glycol: 4) (product name: BLEMMER (registered trademark) PDE-200, manufactured by NOF Corporation), 1.61 g of 2-methacryloyloxyethylphosphorylcholin (MPC, manufactured by Tokyo Chemical Industry Co., Ltd.), 10.4 mg of dimethyl 1,1'-azobis(1-cyclohexanecarboxylate) (product name: VE-073, manufactured by FUJIFILM Wako Pure Chemical Corporation), 5.62 g of ethanol (manufactured by Kanto Chemical Co., Inc.), and 5.60 g of pure water were mixed together and uniformly stirred to prepare a mixture. Separately, 5.16 g of pure water and 5.00 g of ethanol (manufactured by Kanto Chemical Co., Inc.) were placed in a three-necked flask equipped with a condenser, and increased in temperature to the reflux temperature while stirring. While maintaining this state, the above-prepared mixture was dropwise added to the boiling liquid of the lower layer by a dropping funnel over one hour. After the addition, the resultant mixture was heated while stirring for 23 hours in the state in which the above-mentioned environment was maintained. After completion of the reaction, the mixture was cooled to obtain a copolymer-containing solution having a solids content of about 14.25% by mass. The obtained liquid had a weight average molecular weight of about 300,000, as measured by GFC.

Synthesis Example 11

1.52 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.64 g of an about 80% aqueous solution of methacryloylcholin chloride (manufactured by Tokyo Chemical Industry Co., Ltd.), 0.61 g of butyl methacrylate (manufactured by Tokyo Chemical Industry Co., Ltd.), 0.61 g (% by mass, based on the mass of the copolymer: 18.7% by mass) of ethylene glycol dimethacrylate (manufactured by Tokyo Chemical Industry Co., Ltd.), 14.5 g of ethanol (manufactured by Kanto Chemical Co., Inc.), and 18.2 mg of dimethyl 1,1'-azobis(1-cyclohexanecarboxylate) (product name: VE-073, manufactured by FUJIFILM Wako Pure Chemical Corporation) were mixed together and uniformly stirred to prepare a mixture. Separately, 14.5 g of ethanol (manufactured by Kanto Chemical Co., Inc.) was placed in a four-necked flask equipped with a condenser and the flask was purged with nitrogen gas, and the temperature of the ethanol was increased to the reflux temperature while stirring. While maintaining this state, the above-prepared mixture was dropwise added to the ethanol over one hour, and, after the addition, the resultant mixture was heated while stirring for 24 hours in the state in which the above-mentioned environment was maintained. After completion of the reaction, the mixture was cooled to obtain a copolymer-containing solution having a solids content of about 12.1% by mass. The obtained liquid had a weight average molecular weight of about 220,000, as measured by GFC.

Synthesis Example 12

The copolymer-containing liquid obtained in Synthesis Example 11 was subjected to reprecipitation in hexane which is a poor solvent, and the resultant precipitate was recovered by filtration and subjected to vacuum drying. The obtained powder had a weight average molecular weight of about 230,000, as measured by GFC.

Synthesis Example 13

1.50 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.64 g of an about 80% aqueous solution of methacryloylcholin chloride (manufactured by Tokyo Chemical Industry Co., Ltd.), 0.52 g of butyl methacrylate (manufactured by Tokyo Chemical Industry Co., Ltd.), 0.74 g (% by mass, based on the mass of the copolymer: 22.6% by mass) of ethylene glycol dimethacrylate (manufactured by Tokyo Chemical Industry Co., Ltd.), 14.7 g of ethanol (manufactured by Kanto Chemical Co., Inc.), and 17.8 mg of dimethyl 1,1'-azobis(1-cyclohexanecarboxylate) (product name: VE-073, manufactured by FUJIFILM Wako Pure Chemical Corporation) were mixed together and uniformly stirred to prepare a mixture. Separately, 14.5 g of ethanol (manufactured by Kanto Chemical Co., Inc.) was placed in a four-necked flask equipped with a condenser and the flask was purged with nitrogen gas, and the temperature of the ethanol was increased to the reflux temperature while stirring. While maintaining this state, the above-prepared mixture was dropwise added to the ethanol over one hour, and, after the addition, the resultant mixture was heated while stirring for 24 hours in the state in which the above-mentioned environment was maintained. After completion of the reaction, the mixture was cooled to obtain a copolymer-containing solution having a solids content of about 10.4% by mass. The obtained liquid had a weight average molecular weight of about 170,000, as measured by GFC.

Synthesis Example 14

The copolymer-containing liquid obtained in Synthesis Example 13 was subjected to reprecipitation in hexane which is a poor solvent, and the resultant precipitate was recovered by filtration and subjected to vacuum drying. The obtained powder had a weight average molecular weight of about 170,000, as measured by GFC.

Synthesis Example 15

2.00 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.85 g of an about 80% aqueous solution of methacryloylcholin chloride (manufactured by Tokyo Chemical Industry Co., Ltd.), 0.57 g of butyl methacrylate (manufactured by Tokyo Chemical Industry Co., Ltd.), 1.12 g (% by mass, based on the mass of the copolymer: 25.6% by mass) of ethylene glycol dimethacrylate (manufactured by Tokyo Chemical Industry Co., Ltd.), 19.8 g of ethanol (manufactured by Kanto Chemical Co., Inc.), and 23.9 mg of dimethyl 1,1'-azobis(1-cyclohexanecarboxylate) (product name: VE-073, manufactured by FUJIFILM Wako Pure Chemical Corporation) were mixed together and uniformly stirred to prepare a mixture. Separately, 19.8 g of ethanol (manufactured by Kanto Chemical Co., Inc.) was placed in a four-necked flask equipped with a condenser and the flask was purged with nitrogen gas, and the temperature of the ethanol was increased to the reflux temperature while stirring. While maintaining this state, the above-prepared mixture was dropwise added to the ethanol over one hour, and, after the addition, the resultant mixture was heated while stirring for 24 hours in the state in which the above-mentioned environment was maintained. After completion of the reaction, the mixture was cooled to obtain a copolymer-containing solution having a solids content of about 9.9% by mass. The obtained liquid had a weight average molecular weight of about 260,000, as measured by GFC.

Synthesis Example 16

2.02 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.85 g of an about 80% aqueous solution of methacryloylcholin chloride (manufactured by Tokyo Chemical Industry Co., Ltd.), 0.46 g of butyl methacrylate (manufactured by Tokyo Chemical Industry Co., Ltd.), 1.29 g (% by mass, based on the mass of the copolymer: 29.0% by mass) of ethylene glycol dimethacrylate (manufactured by Tokyo Chemical Industry Co., Ltd.), 20.0 g of ethanol (manufactured by Kanto Chemical Co., Inc.), and 25.3 mg of dimethyl 1,1'-azobis(1-cyclohexanecarboxylate) (product name: VE-073, manufactured by FUJIFILM Wako Pure Chemical Corporation) were mixed together and uniformly stirred to prepare a mixture. Separately, 20.0 g of ethanol (manufactured by Kanto Chemical Co., Inc.) was placed in a four-necked flask equipped with a condenser and the flask was purged with nitrogen gas, and the temperature of the ethanol was increased to the reflux temperature while stirring. While maintaining this state, the above-prepared mixture was dropwise added to the ethanol over one hour, and, after the addition, the resultant mixture was heated while stirring for 24 hours in the state in which the above-mentioned environment was maintained. After completion of the reaction, the mixture was cooled to obtain a copolymer-containing solution having a solids content of about 10.1% by mass. The obtained liquid had a weight average molecular weight of about 260,000, as measured by GFC.

Synthesis Example 17

The copolymer-containing liquid obtained in Synthesis Example 16 was subjected to reprecipitation in hexane which is a poor solvent, and the resultant precipitate was recovered by filtration and subjected to vacuum drying. The obtained powder had a weight average molecular weight of about 260,000, as measured by GFC.

Comparative Synthesis Example 1

16.70 g of ethanol was added to 2.27 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass) to well dissolve the monomethacrylate. Then, 0.80 g of 2-(dimethylamino) ethyl methacrylate (manufactured by Tokyo Chemical Industry Co., Ltd.) and 11.23 g of pure water were added and the resultant mixture was well stirred. 15.7 mg of dimethyl 1,1'-azobis(1-cyclohexanecarboxylate) (product name: VE-073, manufactured by FUJIFILM Wako Pure Chemical Corporation) was added. A 100 mL flask containing a mixture having all the above materials, which had been well stirred and uniform, was purged with nitrogen gas, and the temperature of the mixture was increased to the reflux temperature while stirring (oil bath temperature: set at 95° C.). The mixture was heated while stirring for 24 hours in the state in which the above-mentioned environment was maintained, obtaining a copolymer-containing varnish having a solids content of about 10.60% by mass. The obtained liquid had a weight average molecular weight of about 310,000, as measured by GFC.

Comparative Synthesis Example 2

2.8 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 2.7 g (% by mass, based on the mass of the copolymer: 41.5% by mass) of polyethylene glycol dimethacrylate (average addition molar number of polyethylene glycol: 4) (product name: BLEMMER (registered trademark) PDE-200, manufactured by NOF Corporation), 1.0 g of dimethylaminoethyl methacrylate (manufactured by Mitsubishi Gas Chemical Company, Inc.), 32.3 mg of dimethyl 1,1'-azobis(1-cyclohexanecarboxylate) (product name: VE-073, manufactured by FUJIFILM Wako Pure Chemical Corporation), and 23.4 g of ethanol (manufactured by Kanto Chemical Co., Inc.) were mixed together and uniformly stirred to prepare a mixture. Separately, 23.4 g of ion-exchanged water and 11.7 g of ethanol (manufactured by Kanto Chemical Co., Inc.) were placed in a three-necked flask equipped with a condenser, and increased in temperature to the reflux temperature while stirring. While maintaining this state, the above-prepared mixture was dropwise added to the boiling liquid of ion-exchanged water by a dropping pump through a Teflon (registered trademark) tube over one hour. After completion of the addition, the resultant mixture was heated while stirring for 2 hours in the state in which the above-mentioned environment was maintained, and an occurrence of gelation was confirmed.

Comparative Synthesis Example 3

11.55 g of ethanol was added to 1.37 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass) to well dissolve the monomethacrylate. Then, 0.49 g of 2-(dimethylamino) ethyl methacrylate (manufactured by Tokyo Chemical Industry Co., Ltd.), 0.30 g (% by mass, based on the mass of the copolymer: 13.9% by mass) of polyethylene glycol monomethacrylate (average addition molar number of polyethylene glycol: 8) (product name: BLEMMER (registered trademark) PE-350, manufactured by NOF Corporation), and 7.76 g of pure water were added and the resultant mixture was well stirred. 10.7 mg of dimethyl 1,1'-azobis (1-cyclohexanecarboxylate) (product name: VE-073, manufactured by FUJIFILM Wako Pure Chemical Corporation) was added. A 100 mL flask containing a mixture having all the above materials, which had been well stirred and uniform, was purged with nitrogen gas, and the temperature of the mixture was increased to the reflux temperature while stirring (oil bath temperature: set at 95° C.). The mixture was heated while stirring for 24 hours in the state in which the above-mentioned environment was maintained, obtaining a copolymer-containing varnish having a solids content of about 10.26% by mass. The obtained liquid had a weight average molecular weight of about 410,000, as measured by GFC.

Comparative Synthesis Example 4

13.57 g of ethanol was added to 1.83 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass) to well dissolve the monomethacrylate. Then, 1.18 g of 2-methacryloyloxyethylphosphorylcholin (MPC, manufactured by Tokyo Chemical Industry Co., Ltd.) and 13.56 g of pure water were added and the resultant mixture was well stirred. 15.1 mg of dimethyl 1,1'-azobis(1-cyclohexanecarboxylate) (product name: VE-073, manufactured by FUJIFILM Wako Pure Chemical Corporation) was added. A 100 mL flask containing a mixture having all the above materials, which had been well stirred and uniform, was purged with nitrogen gas, and the temperature of the mixture was increased to the reflux temperature while stirring. The mixture was heated while stirring for 24 hours in the state in which the above-mentioned environment was maintained, obtaining a copolymer-containing varnish having a solids content of about 9.94% by mass. The obtained liquid had a weight average molecular weight of about 590,000, as measured by GFC.

Comparative Synthesis Example 5

15.75 g of ethanol was added to 1.37 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass) to well dissolve the monomethacrylate. Then, 2.10 g of 2-methacryloyloxyethylphosphorylcholin (MPC, manufactured by Tokyo Chemical Industry Co., Ltd.) and 15.76 g of pure water were added and the resultant mixture was well stirred. 17.6 mg of dimethyl 1,1'-azobis(1-cyclohexanecarboxylate) (product name: VE-073, manufactured by FUJIFILM Wako Pure Chemical Corporation) was added. A 100 mL flask containing a mixture having all the above materials, which had been well stirred and uniform, was purged with nitrogen gas, and the temperature of the mixture was increased to the reflux temperature while stirring. The mixture was heated while stirring for 24 hours in the state in which the above-mentioned environment was maintained, obtaining a copolymer-containing varnish having a solids content of about 9.94% by mass. The obtained liquid had a weight average molecular weight of about 150,000, as measured by GFC.

Comparative Synthesis Example 6

1.84 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 0.84 g of an about 80% aqueous solution of methacryloylcholin chloride (manufactured by Tokyo Chemical Industry Co., Ltd.), 14.4 g of ethanol (manufactured by Kanto Chemical Co., Inc.), 9.6 g of pure water, and 13.2 mg of dimethyl 1,1'-azobis(1-cyclohexanecarboxylate) (product name: VE-073, manufactured by FUJIFILM Wako Pure Chemical Corporation) were placed in a four-necked flask equipped with a condenser and the flask was purged with nitrogen gas, and the temperature of the resultant mixture was increased to the reflux temperature while stirring. The mixture was heated while stirring for 24 hours in the state in which the above-mentioned environment was maintained. After completion of the reaction, the mixture was cooled to obtain a copolymer-containing solution having a solids content of about 10.7% by mass. The obtained liquid had a weight average molecular weight of about 140,000, as measured by GFC.

Comparative Synthesis Example 7

2.30 g of acid phosphoxy polypropylene glycol monomethacrylate (average addition molar number of propylene oxide: 5) (product name: PPM-5P, manufactured by Toho Chemical Industry Co., Ltd.; absolute mass % (purity): 97.3% by mass), 1.08 g of an about 80% aqueous solution of methacryloylcholin chloride (manufactured by Tokyo Chemical Industry Co., Ltd.), 1.43 g of butyl methacrylate (manufactured by Tokyo Chemical Industry Co., Ltd.), 18.2 g of ethanol (manufactured by Kanto Chemical Co., Inc.), 12.1 g of pure water, and 22.8 mg of dimethyl 1,1'-azobis (1-cyclohexanecarboxylate) (product name: VE-073, manufactured by FUJIFILM Wako Pure Chemical Corporation) were placed in a four-necked flask equipped with a condenser and the flask was purged with nitrogen gas, and the temperature of the resultant mixture was increased to the reflux temperature while stirring. The mixture was heated while stirring for 24 hours in the state in which the above-mentioned environment was maintained. After completion of the reaction, the mixture was cooled to obtain a copolymer-containing solution having a solids content of about 13.4% by mass. The obtained liquid had a weight average molecular weight of about 56,000, as measured by GFC.

Preparation Example 1

To 0.99 g of the copolymer-containing varnish obtained in Synthesis Example 1 above were added 6.60 g of pure water and 2.42 g of ethanol, and the resultant mixture was well stirred to prepare a composition for forming a coating film. The pH was 5.8. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with a phosphate buffer (hereinafter, abbreviated to "PBS") and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 5.4 nm.

Preparation Example 2

To 1.00 g of the copolymer-containing varnish obtained in Synthesis Example 2 above were added 6.57 g of pure water and 2.44 g of ethanol, and the resultant mixture was well stirred to prepare a composition for forming a coating film. The pH was 5.9. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 11.1 nm.

Preparation Example 3

To 1.00 g of the copolymer-containing varnish obtained in Synthesis Example 3 above were added 6.53 g of pure water, 2.43 g of ethanol, and 29.2 mg of 1 N hydrochloric acid (manufactured by Kanto Chemical Co., Inc.), and the resultant mixture was well stirred to prepare a composition for forming a coating film. The pH was 3.8. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 16.4 nm.

Preparation Example 4

To 1.02 g of the copolymer-containing varnish obtained in Synthesis Example 3 above were added 6.68 g of pure water and 2.44 g of ethanol, and the resultant mixture was well stirred to prepare a composition for forming a coating film. The pH was 5.9. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 17.8 nm.

Preparation Example 5

To 1.01 g of the copolymer-containing varnish obtained in Synthesis Example 3 above were added 2.67 g of pure water and 6.41 g of ethanol, and the resultant mixture was well stirred to prepare a composition for forming a coating film. The pH was 6.5. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 18.9 nm.

Preparation Example 6

To 1.00 g of the copolymer-containing varnish obtained in Synthesis Example 3 above were added 2.59 g of pure water, 6.38 g of ethanol, and 27 mg of a 1 N aqueous solution of sodium hydroxide (manufactured by Kanto Chemical Co., Inc.), and the resultant mixture was well stirred to prepare a composition for forming a coating film. The pH was 7.4. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 22.9 nm.

Preparation Example 7

To 1.49 g of the copolymer-containing varnish obtained in Synthesis Example 5 above were added 3.92 g of pure water and 9.59 g of ethanol, and the resultant mixture was well stirred to prepare a composition for forming a coating film. The pH was 6.3. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 5.4 nm.

Preparation Example 8

To 1.10 g of the copolymer-containing varnish obtained in Synthesis Example 6 above were added 3.65 g of pure water, 9.64 g of isopropyl alcohol, and 73 mg of 1 N hydrochloric acid (manufactured by Kanto Chemical Co., Inc.), and the resultant mixture was well stirred to prepare a composition for forming a coating film. The pH was 3.1. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 6.2 nm.

Preparation Example 9

To 1.11 g of the copolymer-containing varnish obtained in Synthesis Example 6 above were added 3.70 g of pure water, 9.65 g of isopropyl alcohol, and 19 mg of 1 N hydrochloric acid (manufactured by Kanto Chemical Co., Inc.), and the resultant mixture was well stirred to prepare a composition for forming a coating film. The pH was 4.0. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 4.2 nm.

Preparation Example 10

To 1.51 g of the copolymer-containing varnish obtained in Synthesis Example 7 above were added 3.92 g of pure water and 9.59 g of ethanol, and the resultant mixture was well stirred to prepare a composition for forming a coating film. The pH was 2.7. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 4.8 nm.

Preparation Example 11

To 1.50 g of the copolymer-containing varnish obtained in Synthesis Example 7 above were added 3.72 g of pure water, 9.59 g of ethanol, and 0.20 g of a 1 N aqueous solution of sodium hydroxide (manufactured by Kanto Chemical Co., Inc.), and the resultant mixture was well stirred to prepare a composition for forming a coating film. The pH was 8.0. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 4.6 nm.

Preparation Example 12

To 1.50 g of the copolymer-containing varnish obtained in Synthesis Example 8 above were added 4.00 g of pure water and 9.61 g of ethanol, and the resultant mixture was well stirred to prepare a composition for forming a coating film. The pH was 2.3. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 3.9 nm.

Preparation Example 13

To 1.50 g of the copolymer-containing varnish obtained in Synthesis Example 8 above were added 3.72 g of pure water, 9.59 g of ethanol, and 0.20 g of a 1 N aqueous solution of sodium hydroxide (manufactured by Kanto Chemical Co., Inc.), and the resultant mixture was well stirred to prepare a composition for forming a coating film. The pH was 7.4. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 3.9 nm.

Preparation Example 14

To 0.80 g of the copolymer-containing varnish obtained in Synthesis Example 9 above were added 3.54 g of pure water and 8.71 g of ethanol, and the resultant mixture was well stirred to prepare a composition for forming a coating film. The pH was 3.3. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 5.1 nm.

Preparation Example 15

To 0.80 g of the copolymer-containing varnish obtained in Synthesis Example 9 above were added 3.50 g of pure water, 8.71 g of ethanol, and 45 mg of a 1 N aqueous solution of sodium hydroxide (manufactured by Kanto Chemical Co., Inc.), and the resultant mixture was well stirred to prepare a composition for forming a coating film. The pH was 4.0. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 6.3 nm.

Preparation Example 16

To 0.80 g of the copolymer-containing varnish obtained in Synthesis Example 9 above were added 3.43 g of pure water, 8.71 g of ethanol, and 0.11 g of a 1 N aqueous solution of sodium hydroxide (manufactured by Kanto Chemical Co., Inc.), and the resultant mixture was well stirred to prepare a composition for forming a coating film. The pH was 5.9. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 6.7 nm.

Preparation Example 17

To 1.0 g of the copolymer-containing varnish obtained in Synthesis Example 10 above were added 3.79 g of pure water, 9.45 g of ethanol, and 9.6 mg of a 1 N aqueous solution of sodium hydroxide (manufactured by Kanto Chemical Co., Inc.), and the resultant mixture was well stirred to prepare a composition for forming a coating film. The pH was 4.0. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 6.1 nm.

Preparation Example 18

To 1.0 g of the copolymer-containing varnish obtained in Synthesis Example 10 above were added 3.77 g of pure water, 9.45 g of ethanol, and 35 mg of a 1 N aqueous solution of sodium hydroxide (manufactured by Kanto Chemical Co., Inc.), and the resultant mixture was well stirred to prepare a composition for forming a coating film. The pH was 6.2. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 5.2 nm.

Preparation Example 19

To 1.00 g of the copolymer-containing varnish obtained in Synthesis Example 11 above were added 7.49 g of ethanol and 3.61 g of pure water, and the resultant mixture was well stirred to prepare a composition for forming a coating film. The pH was 2.9. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 27.7 nm.

Preparation Example 20

To 0.12 g of the copolymer obtained in Synthesis Example 12 above were added 8.33 g of ethanol and 3.61 g of pure water, and the resultant mixture was well stirred to prepare a composition for forming a coating film. The pH was 2.9. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 38.9 nm.

Preparation Example 21

To 1.22 g of the copolymer-containing varnish obtained in Synthesis Example 13 above were added 7.62 g of ethanol and 3.75 g of pure water, and the resultant mixture was well stirred to prepare a composition for forming a coating film. The pH was 2.9. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 27.5 nm.

Preparation Example 22

To 0.12 g of the copolymer obtained in Synthesis Example 14 above were added 8.33 g of ethanol and 3.59 g of pure water, and the resultant mixture was well stirred to prepare a composition for forming a coating film. The pH was 2.9. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 39.7 nm.

Preparation Example 23

To 1.31 g of the copolymer-containing varnish obtained in Synthesis Example 15 above were added 7.77 g of ethanol and 3.86 g of pure water, and the resultant mixture was well stirred to prepare a composition for forming a coating film. The pH was 2.9. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 45.3 nm.

Preparation Example 24

To 1.31 g of the copolymer-containing varnish obtained in Synthesis Example 16 above were added 8.00 g of ethanol and 3.94 g of pure water, and the resultant mixture was well stirred to prepare a composition for forming a coating film. The pH was 2.9. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 27.8 nm.

Preparation Example 25

To 0.12 g of the copolymer obtained in Synthesis Example 17 above were added 8.33 g of ethanol and 3.61 g of pure water, and the resultant mixture was well stirred to prepare a composition for forming a coating film. The pH was 2.9. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 35.8 nm.

Comparative Preparation Example 1

To 0.80 g of the copolymer-containing varnish obtained in Comparative Synthesis Example 1 above were added 5.26 g of pure water and 1.94 g of ethanol, and the resultant mixture was well stirred to prepare a composition for forming a coating film. The pH was 5.9. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 4.0 nm.

Comparative Preparation Example 2

To 0.80 g of the copolymer-containing varnish obtained in Comparative Synthesis Example 1 above were added 1.89 g of pure water, 5.11 g of ethanol, and 0.25 g of a 0.1 mol/L aqueous solution of sodium hydroxide (a 1 N aqueous solution of sodium hydroxide (manufactured by Kanto Chemical Co., Inc.)) was diluted 10-fold with pure water and used), and the resultant mixture was well stirred to prepare a composition for forming a coating film. The pH was 7.5. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 3.8 nm.

Comparative Preparation Example 3

To 1.00 g of the copolymer-containing varnish obtained in Comparative Synthesis Example 3 above were added 6.55 g of pure water, 2.44 g of ethanol, and 24.1 mg of 1 N hydrochloric acid (manufactured by Kanto Chemical Co., Inc.), and the resultant mixture was well stirred to prepare a composition for forming a coating film. The pH was 4.6. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 6.5 nm.

Comparative Preparation Example 4

To 1.00 g of the copolymer-containing varnish obtained in Comparative Synthesis Example 3 above were added 6.59 g of pure water, 2.40 g of ethanol, and 28.5 mg of a 1 N aqueous solution of sodium hydroxide (manufactured by Kanto Chemical Co., Inc.), and the resultant mixture was well stirred to prepare a composition for forming a coating film. The pH was 6.6. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 9.1 nm.

Comparative Preparation Example 5

To 1.5 g of the copolymer-containing varnish obtained in Comparative Synthesis Example 4 above were added 3.62 g of pure water, 9.66 g of ethanol, and 0.16 g of a 1 N aqueous solution of sodium hydroxide (manufactured by Kanto Chemical Co., Inc.), and the resultant mixture was well stirred to prepare a composition for forming a coating film. The pH was 5.9. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 5.3 nm.

Comparative Preparation Example 6

To 1.5 g of the copolymer-containing varnish obtained in Comparative Synthesis Example 5 above were added 3.72 g of pure water, 9.66 g of ethanol, and 44 mg of a 1 N aqueous solution of sodium hydroxide (manufactured by Kanto Chemical Co., Inc.), and the resultant mixture was well stirred to prepare a composition for forming a coating film. The pH was 4.0. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 2.6 nm.

Comparative Preparation Example 7

To 1.5 g of the copolymer-containing varnish obtained in Comparative Synthesis Example 5 above were added 3.65 g of pure water, 9.67 g of ethanol, and 0.11 g of a 1 N aqueous solution of sodium hydroxide (manufactured by Kanto Chemical Co., Inc.), and the resultant mixture was well stirred to prepare a composition for forming a coating film. The pH was 5.9. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 2.8 nm.

Comparative Preparation Example 8

To 1.00 g of the copolymer-containing varnish obtained in Comparative Synthesis Example 6 above were added 6.39 g of ethanol and 2.63 g of pure water, and the resultant mixture was well stirred to prepare a composition for forming a coating film. The pH was 2.7. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 3.7 nm.

Comparative Preparation Example 9

To 1.00 g of the copolymer-containing varnish obtained in Comparative Synthesis Example 7 above were added 8.79 g of ethanol and 3.66 g of pure water, and the resultant mixture was well stirred to prepare a composition for forming a coating film. The pH was 2.8. The obtained composition for forming the coating film was applied to an HMDS-treated silicon wafer by spin coating at 1,500 rpm/60 sec, and dried in the drying step at 50° C. for 3 hours. Then, the resultant film was well washed with a phosphate buffer and then dried at 70° C. for one hour, obtaining a coating film on the HMDS-treated silicon wafer. A thickness of the coating film on the HMDS-treated silicon wafer was measured by a spectroscopic ellipsometer, and found to be 24.6 nm.

Reference Example 1

To 0.25 g of Lipidure-CM5206 (manufactured by NOF Corporation) was added 49.75 g of ethanol, and the resultant mixture was well stirred to prepare a composition for forming a coating film. The obtained composition for forming the coating film was applied to an HMDS-treated silicon wafer by spin coating at 1,500 rpm/60 sec, and dried in the drying step using an oven at 50° C. for 24 hours. Then, the resultant film was well washed with PBS and then dried in an oven at 50° C. for one hour, obtaining a coating film on the HMDS-treated silicon wafer. A thickness of the coating film on the HMDS-treated silicon wafer was measured by a spectroscopic ellipsometer, and found to be 25.4 nm.

Test Example 1: Cell Adhesion Inhibition Effect (Preparation of a Coated Plate)
Each of the compositions for forming the coating film prepared in Preparation Examples 1 to 18 and Comparative Preparation Examples 2 and 4 to 7 was placed in wells of a 96-well cell culture plate (#351172, manufactured by Corning Inc.; volume: 0.37 mL; made of polystyrene) in an amount of 200 μL/well, and allowed to stand at room temperature for one hour, and then the excess varnish was removed. The resultant plate was dried using an oven at 50° C. for 24 hours. Then, each of the coated wells was washed three times with 250 μL of pure water, and dried using an oven at 50° C. for one hour, and then used in the test. As a positive control, there was used a 96-well cell culture plate (#351172, manufactured by Corning Inc.; volume: 0.37 mL; made of polystyrene) having wells which were coated with the composition for forming the coating film prepared in Reference Example 1 by the same procedure as described above. As a negative control, a 96-well cell culture plate (#351172, manufactured by Corning Inc.; volume: 0.37 mL; made of polystyrene) having wells which are not coated was used.

(Preparation of Cells)

As a cell, mouse embryonic fibroblast C3H10T1/2 cell line (available by DS Pharma Biomedical Co., Ltd.) was used. As a medium for cell culture, a BME medium (manufactured by Thermo Fisher Scientific K.K.) containing 10% FBS (manufactured by Sigma-Aldrich Co., LLC.) and an L-glutamine-penicillin-streptomycin stabilized solution (manufactured by Thermo Fisher Scientific K.K.) was used. The cells were cultured in a Petri dish (medium: 10 mL) having a diameter of 10 cm and allowed to stand in a 37° C./$CO_2$ incubator for two or more days under conditions such that the 5% carbon dioxide concentration was maintained. Subsequently, these cells were washed with 5 mL of PBS, and then 1 mL of a 0.25 w/v % trypsin-1 mmol/L EDTA solution (manufactured by FUJIFILM Wako Pure Chemical Corporation) was added and the cells were detached and suspended in 10 mL of the above-mentioned medium. This suspension was centrifuged (model LC-200, manufactured by Tomy Seiko Co., Ltd.; 1,000 rpm/3 minutes; room temperature), and then the supernatant was removed, and the above-mentioned medium was added to prepare a cell suspension.

(Experiment for Cell Adhesion)

150 µL of the cell suspension was dispensed into the wells of the above-prepared plate, positive control, and negative control so as to be in an amount of $1 \times 10^4$ cells/well. Then, the plate or control was allowed to stand in a $CO_2$ incubator at 37° C. for three days under conditions such that the 5% carbon dioxide concentration was maintained.

(Observation of Cell Adhesion)

Figure 2:
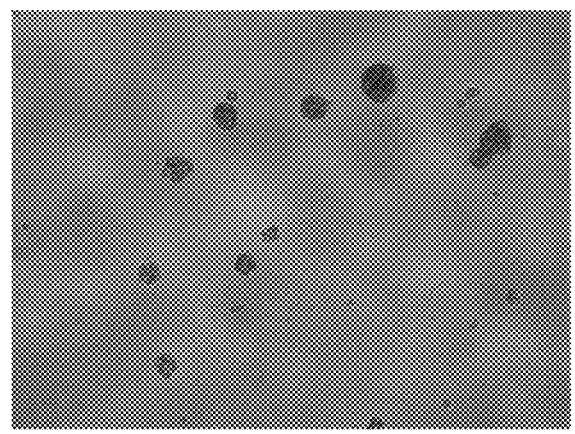
FIG. 2 A photomicrograph of the well coated with the composition for forming the coating film prepared in Preparation Example 4, which has been subjected to Test Example 1.
Figure 3:
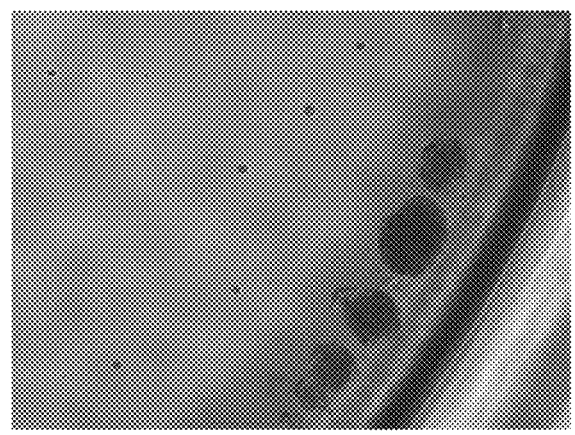
FIG. 3 A photomicrograph of the well coated with the composition for forming the coating film prepared in Preparation Example 5, which has been subjected to Test Example 1.
Figure 4:
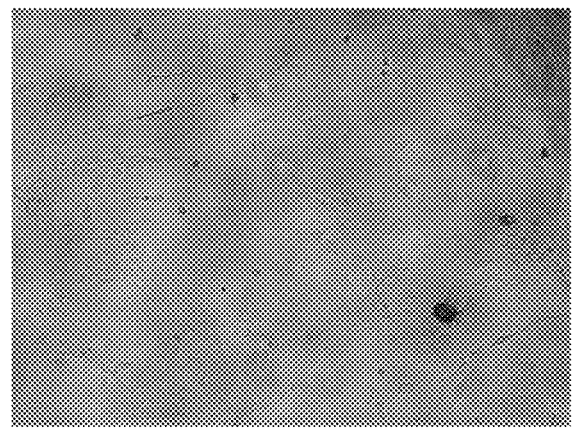
FIG. 4 A photomicrograph of the well coated with the composition for forming the coating film prepared in Comparative Preparation Example 4, which has been subjected to Test Example 1.
Figure 5:
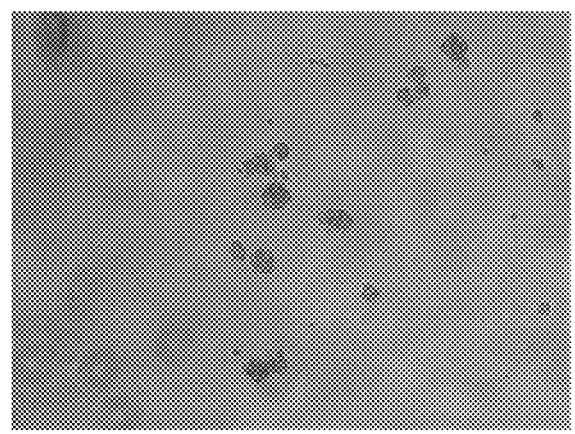
FIG. 5 A photomicrograph of the well coated with the composition for forming the coating film prepared in Reference Example 1 (positive control), which has been subjected to Test Example 1.
Figure 6:
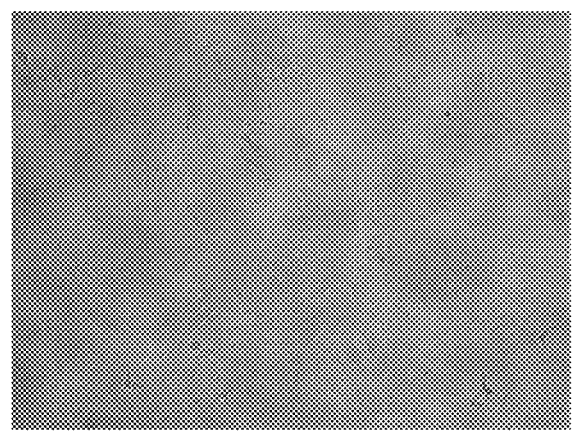
FIG. 6 A photomicrograph of the uncoated well (negative control) which has been subjected to Test Example 1.

After the three-day culture, a comparison was made between the wells of the above-prepared plate, positive control, and negative control with respect to adhesion of the cell, based on the observation (magnification: 4 times) using an inverted microscope (ECLIPSE TS100-F, manufactured by Nikon Corporation). The results are shown in Table 1. As seen from Table 1, in the plate having the surface treated with each of the compositions for forming the coating film prepared in Preparation Examples 1 to 5 and Reference Example 1 (positive control), no adhesion or spread of the cell was found, and the formation of spheroid was observed in the wells. In contrast, in the plate having the surface treated with each of the compositions for forming the coating film prepared in Comparative Preparation Examples 2 and 4 to 7 and the plate which is not coated (negative control), the formation of spheroid was partially observed, but almost all the cells adhered to the bottom of the plate and spread. As typical examples of the cell observation, photomicrographs of the wells of the plates coated with the coating agents of Preparation Examples 3, 4, and 5, Comparative Preparation Example 4, and the positive control (Reference Example 1) and the negative control are shown in FIGS. 1 to 6.

TABLE 1

| Coating agent | Inhibition of cell adhesion |
| --- | --- |
| Preparation Example 1 | ○ |
| Preparation Example 2 | ○ |
| Preparation Example 3 | ○ |
| Preparation Example 4 | ○ |
| Preparation Example 5 | ○ |
| Preparation Example 6 | ○ |
| Preparation Example 7 | ○ |
| Preparation Example 8 | ○ |
| Preparation Example 9 | ○ |
| Preparation Example 10 | ○ |
| Preparation Example 11 | ○ |
| Preparation Example 12 | ○ |
| Preparation Example 13 | ○ |
| Preparation Example 14 | ○ |
| Preparation Example 15 | ○ |
| Preparation Example 16 | ○ |
| Preparation Example 17 | ○ |
| Preparation Example 18 | ○ |
| Comparative Preparation Example 2 | X |
| Comparative Preparation Example 4 | X |
| Comparative Preparation Example 5 | X |
| Comparative Preparation Example 6 | X |
| Comparative Preparation Example 7 | X |
| Positive control | ○ |
| Negative control | X |

Test Example 2: Protein Adsorption Inhibition Effect (Preparation of a QCM Sensor (PS))

An Au-deposited quartz crystal unit (Q-Sence, QSX301) was cleaned using a soft etching machine (SEDE-GE, manufactured by Meiwafosis Co., Ltd.) at 50 mA/3 min, and then immediately immersed in a solution having 0.0772 g of 2-aminoethanethiol (manufactured by Tokyo Chemical Industry Co., Ltd.) dissolved in 1,000 mL of ethanol for 24 hours. The surface of the sensor was washed with ethanol and then air-dried, and a varnish having 1.00 g of polystyrene (PS) (manufactured by Sigma-Aldrich Co., LLC.) dissolved in 99.00 g of toluene was applied to the film sensor side by spin coating using a spin coater at 3,500 rpm/30 sec, and dried at 150° C./1 min to prepare a QCM sensor (PS).

(Preparation of a QCM Sensor ($SiO_2$))

An $SiO_2$-deposited quartz crystal unit (Q-Sence, QSX303) was cleaned using a soft etching machine (SEDE-GE, manufactured by Meiwafosis Co., Ltd.) at 50 mA/3 min, and used as such.

(Preparation of a Surface-Treated QCM Sensor (PS) and a Surface-Treated QCM Sensor ($SiO_2$))

The compositions for forming the coating film obtained in Preparation Examples 1 to 18, Comparative Preparation Examples 1 to 7, and Reference Example 1 were individually applied to the QCM sensor (PS) by spin coating at 3,500 rpm/30 sec, and baked in the drying step using an oven at 50° C. for 24 hours. Then, in the cleaning step, the excess composition for forming the coating film was washed twice with PBS and twice with pure water, obtaining a surface-treated QCM sensor (PS) (substrate Nos. 1 to 26). Similarly, the compositions for forming the coating film obtained in Preparation Examples 1 and 2 and Comparative Preparation Example 1 were individually applied to the QCM sensor ($SiO_2$) by spin coating at 3,500 rpm/30 sec, and baked in the drying step using an oven at 50° C. for 24 hours. Then, in the cleaning step, the excess composition for forming the coating film was washed twice with PBS and twice with pure water, obtaining a surface-treated QCM sensor (SiO$_2$) (substrate Nos. 28 to 30). As a positive control, the surface-treated QCM sensor (PS) coated with the composition for forming the coating film obtained in Reference Example 1 (substrate No. 26) was used. As a negative control, a QCM sensor (PS) (substrate No. 27) and a QCM sensor (SiO$_2$) (substrate No. 31) were used.

(Experiment for Protein Adsorption)

The surface-treated QCM sensors (PS) (substrate Nos. 1 to 26) and surface-treated QCM sensors (SiO$_2$) (substrate Nos. 28 to 30), which were prepared using the composition for forming the coating film by the above-described procedure, and the QCM sensor (PS) (substrate No. 27) and QCM sensor (SiO$_2$) (substrate No. 31), which are a negative control, were individually attached to a quartz crystal microbalance with dissipation monitoring QCM-D (E4, Q-Sence), and PBS was permitted to flow until a stabilized base line was achieved such that a change of the frequency for one hour became 1 Hz or less. Then, PBS was permitted to flow at a frequency of 0 Hz for the stabilized base line for about 10 minutes. Subsequently, a 100 µg/mL PBS solution of human serum-derived γ-globulin was permitted to flow for about 30 minutes, and then PBS was further permitted to flow for about 20 minutes and then, a shift (Δf) of the adsorption induced frequency at the 9th overtone was read. For analysis, using Q-Tools (Q-Sence), with respect to the shift (Δf) of the adsorption induced frequency, the shift (Δf) of adsorption induced frequency described by the Sauerbrey equation was converted to a mass per unit area (ng/cm$^2$) and is shown as an adsorption amount of a biological material in Table 2 below. The substrate Nos. 1 to 18 and substrate Nos. 28 and 29 using the compositions for forming the coating film in Preparation Examples 1 to 18 of the present invention as a coating exhibited low protein adsorption amount, as compared to the substrate Nos. 19 to 25 and 30 using the compositions for forming the coating film in Comparative Preparation Examples 1 to 7 as a coating and the substrate Nos. 27 and 31 having no coating.

TABLE 2

| Substrate No. | QCM Sensor | Coating agent | Protein adsorption amount (ng/cm$^2$) |
|---|---|---|---|
| 1 | PS | Preparation Example 1 | 87 |
| 2 | PS | Preparation Example 2 | 79 |
| 3 | PS | Preparation Example 3 | 69 |
| 4 | PS | Preparation Example 4 | 65 |
| 5 | PS | Preparation Example 5 | 17 |
| 6 | PS | Preparation Example 6 | 48 |
| 7 | PS | Preparation Example 7 | 3 |
| 8 | PS | Preparation Example 8 | 66 |
| 9 | PS | Preparation Example 9 | 56 |
| 10 | PS | Preparation Example 10 | 24 |
| 11 | PS | Preparation Example 11 | 17 |
| 12 | PS | Preparation Example 12 | 10 |
| 13 | PS | Preparation Example 13 | 1 |
| 14 | PS | Preparation Example 14 | 33 |
| 15 | PS | Preparation Example 15 | 11 |
| 16 | PS | Preparation Example 16 | 9 |
| 17 | PS | Preparation Example 17 | 59 |
| 18 | PS | Preparation Example 18 | 35 |
| 19 | PS | Comparative Preparation Example 1 | 106 |
| 20 | PS | Comparative Preparation Example 2 | 392 |
| 21 | PS | Comparative Preparation Example 3 | 115 |
| 22 | PS | Comparative Preparation Example 4 | 161 |
| 23 | PS | Comparative Preparation Example 5 | 289 |
| 24 | PS | Comparative Preparation Example 6 | 279 |
| 25 | PS | Comparative Preparation Example 7 | 952 |
| 26 | PS | Reference Example 1 | 29 |
| 27 | PS | None | 796 |
| 28 | SiO2 | Preparation Example 1 | 7 |
| 29 | SiO2 | Preparation Example 2 | 10 |
| 30 | SiO2 | Comparative Preparation Example 1 | 24 |
| 31 | SiO2 | None | 498 |

Test Example 3: Protein Adsorption Inhibition Effect-2

(Preparation of a Coated Plate)

Each of the compositions for forming the coating film prepared in Preparation Examples 19 to 25 and Comparative Preparation Examples 8 and 9 was placed in five wells of a 96-well plate (#3363, manufactured by Corning Inc.; volume: 0.32 mL; made of polypropylene) in an amount of 150 µL/well. The plate was allowed to stand at room temperature for one hour, and then the composition was discarded from the wells and the wells were dried using an oven at 50° C. for 3 hours. Then, each of the wells was washed three times with 200 µL of pure water, and dried using an oven at 50° C. for one hour to prepare a coated plate. As a negative control, a 96-well plate (#3363, manufactured by Corning Inc.; volume: 0.32 mL; made of polypropylene) having wells which are not coated was used.

(Preparation of an IgG-HRP Diluted Solution)

A goat anti-mouse IgG antibody HRP conjugate (manufactured by Southern Biotechnology Associates, Inc.) was diluted with PBS in a concentration of 1 mg/g to prepare an IgG-HRP diluted solution.

(Experiment for Protein Adsorption)

The IgG-HRP diluted solution was placed in each of the wells of the above-prepared plate and the negative control in an amount of 100 µL/well, and allowed to stand at room temperature for 30 minutes. Then, the IgG-HRP diluted solution was discarded from the wells, and each of the wells was washed three times with 200 µL of PBS. A TMB solution (SureBlue, manufactured by SeraCare Life Sciences, Inc.) was added in an amount of 100 µL/well, and, after a lapse of one minute, a TMB STOP solution (manufactured by SeraCare Life Sciences, Inc.) was added in an amount of 100 µL/well. Using a microplate reader (infinite M200PRO, manufactured by TECAN Trading AG), absorbance values at 450 nm and 650 nm were measured. A value was calculated by subtracting the absorbance at 650 nm from the absorbance at 450 nm, and an average absorbance for five wells was obtained with respect to each composition for forming coating film. The average absorbance for the wells of the negative control was taken as a 100% protein adsorption ratio, and a protein adsorption ratio of the wells coated with each composition for forming coating film was determined and shown in Table 3. It is apparent that the wells coated with the compositions for forming the coating film in Preparation Examples 19 to 25 have a small protein adsorption amount and thus have excellent protein adsorp-

TABLE 3

| Composition for forming coating film | Absorbance (450 nm-650 nm) | Protein adsorption ratio [%] |
|---|---|---|
| None | 0.7110 | 100 |
| Preparation Example 19 | 0.0093 | 1.3 |
| Preparation Example 20 | 0.0118 | 1.7 |
| Preparation Example 21 | 0.0149 | 2.1 |
| Preparation Example 22 | 0.0355 | 5.0 |
| Preparation Example 23 | 0.0218 | 3.1 |
| Preparation Example 24 | 0.0276 | 3.9 |
| Preparation Example 25 | 0.0478 | 6.7 |
| Comparative Preparation Example 8 | 0.5657 | 79.6 |
| Comparative Preparation Example 9 | 0.1259 | 17.7 |

INDUSTRIAL APPLICABILITY

The coating film formed from the composition for forming the coating film of the present invention has the improved ability to inhibit adhesion of biological substances. Specifically, the coating film of the present invention has excellent ability to inhibit adhesion of biological substances, such as a protein, and to promote cell culture, and therefore can be advantageously used in various medical devices (for example, a medical filter, a medical tube, a medical module, an artificial organ, an artificial valve, a surgical instrument, and a surgical auxiliary instrument), various instruments for study (for example, cell culture containers, such as a flask, a dish, and a plate, and devices for diagnostic drug for biochemical study), and various articles for daily use (for example, toiletries, articles for personal hygiene, cosmetics, and contact lens care articles).

Further, the composition for forming the coating film of the present invention can also be advantageously used as a blocking agent for inhibiting nonspecific adsorption in an enzyme-linked immunosorbent assay (ELISA) method or latex agglutination method widely used as a clinical diagnosis method, or a stabilizer for stabilizing a protein, such as an enzyme or an antibody.

The invention claimed is:

1. A composition for forming a coating film having the ability to inhibit adhesion of biological substances, the composition comprising a copolymer and a solvent, wherein the copolymer is obtained by subjecting a monomer mixture to polymerization, the monomer mixture comprising a compound represented by the following formula (1-3):

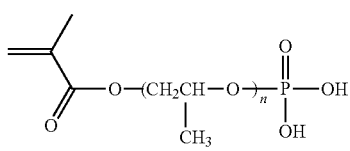

(1-3)

wherein and n represents an integer of 3 to 6, a compound represented by the following formula (2):

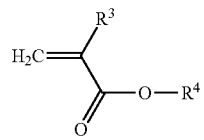

(2)

wherein $R^3$ represents a hydrogen atom or a linear or branched alkyl group having 1 to 5 carbon atoms, and $R^4$ represents a cationic monovalent organic group, and a compound represented by the following formula (3):

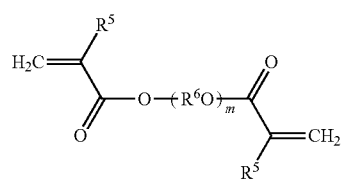

(3)

wherein each $R^5$ independently represents a hydrogen atom or a linear or branched alkyl group having 1 to 6 carbon atoms, $R^6$ represents a linear or branched alkylene group having 1 to 10 carbon atoms which may be substituted with a halogen atom, and m represents an integer of 1 to 30, wherein the amount of the compound represented by the formula (3) is 2 to 40% by mass, based on the mass of the monomer mixture.

2. A coating film having the ability to inhibit adhesion of biological substances, which is a coating film comprising the composition for forming the coating film according to claim 1.

3. A substrate having the ability to inhibit adhesion of biological substances, which has the coating film according to claim 2 on the surface thereof.

4. The substrate having the ability to inhibit adhesion of biological substances according to claim 3, which is for use in cell culture.

5. A method for producing a substrate having the ability to inhibit adhesion of biological substances, comprising the steps of: applying the composition for forming the coating film according to claim 1 to a substrate; and then drying it.

6. A cell culture container having the surface coated with a copolymer, wherein the copolymer is obtained by subjecting a monomer mixture to polymerization, the monomer mixture comprising a compound represented by the following formula (1-3):

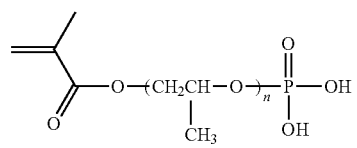

(1-3)

wherein n represents an integer of 3 to 6, a compound represented by the following formula (2):

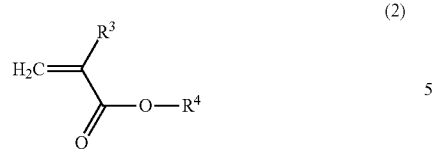
(2)

wherein $R^3$ represents a hydrogen atom or a linear or branched alkyl group having 1 to 6 carbon atoms, and $R^4$ represents a cationic monovalent organic group, and
a compound represented by the following formula (3):

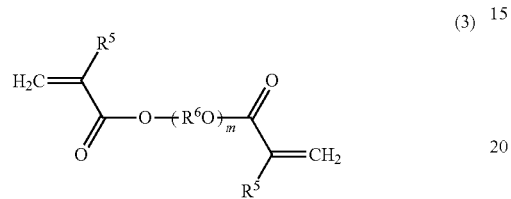
(3)

wherein each $R^5$ independently represents a hydrogen atom or a linear or branched alkyl group having 1 to 6 carbon atoms, Re represents a linear or branched alkylene group having 1 to 10 carbon atoms which may be substituted with a halogen atom, and m represents an integer of 1 to 30,
wherein the amount of the compound represented by the formula (3) is 2 to 40% by mass, based on the mass of the monomer mixture.

\* \* \* \* \*